(12) United States Patent
Tanaka et al.

(10) Patent No.: US 6,285,957 B1
(45) Date of Patent: Sep. 4, 2001

(54) APPARATUS AND METHOD FOR CALCULATING THE STRENGTH OF AN ELECTROMAGNETIC FIELD RADIATED FROM AN ELECTRIC DEVICE

(75) Inventors: Yoshirou Tanaka; Shinichi Ohtsu; Makoto Mukai, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/045,125

(22) Filed: Mar. 20, 1998

(30) Foreign Application Priority Data

Aug. 12, 1997 (JP) .................................... 9-217583

(51) Int. Cl.$^7$ .................................................. G06F 9/455
(52) U.S. Cl. .................. 702/57; 702/65; 702/66; 703/2; 703/3; 703/4
(58) Field of Search ................... 702/57, 64–66, 702/69, 73, 124, 126, 115, 117, 118–120, 123, 182, 183, 189, FOR 103–FOR 105, FOR 110, FOR 114, FOR 130, FOR 135, FOR 170, FOR 171; 703/3–6, 13, 14, 18, 2; 324/200, 260, 262, 263, 534–541, 543, 544, 600, 628, 654, 658

(56) References Cited

U.S. PATENT DOCUMENTS

| | | | |
|---|---|---|---|
| 5,812,434 | * | 9/1998 | Nagase et al. ............................. 703/3 |
| 5,903,477 | * | 5/1999 | Otsu et al. ................................ 703/5 |
| 6,083,266 | * | 7/2000 | Ohtsu et al. .............................. 703/3 |

OTHER PUBLICATIONS

Izumi Masao, "Crosstalk Simulation Method," *Patent Abstracts of Japan* (Oki Electric Ind Co Ltd), JP 08221454 A, Aug. 30, 1996. (Abstract only).

* cited by examiner

*Primary Examiner*—Hal Wachsman
(74) *Attorney, Agent, or Firm*—Staas & Halsey LLP

(57) ABSTRACT

An apparatus and method are provided to calculate the strength of an electromagnetic field radiated from an electric device according to a moment method, wherein the moment method is based on integral equations derived from electromagnetic equations. The apparatus and method include a setting unit to interactively set a name of a two-wire cable arranged in the electric device and coordinates of the two-wire cable at a cable inlet, a cable outlet, and way points in the electric device, the way points being prepared as and when required to bend the two-wire cable between the cable inlet and the cable outlet. Further, the apparatus and method include library unit corresponding to cable names, respectively, and storing attributes of a corresponding cable comprising of the name, type, characteristic impedance, and structural data of the two-wire cable. A generation unit is provided to generate a moment-method model of the two-wire cable according to the attributes of the two-wire cable read out of the at least one library unit specified by the name of the two-wire cable set by the setting unit and the coordinates of the two-wire cable at the cable inlet, cable outlet, and way points set by the setting unit. A calculation unit calculates the strength of the electromagnetic field radiated from the electric device according to the moment-method model of the two-wire cable and the moment method.

13 Claims, 25 Drawing Sheets

Fig. 3A

| NAME OF CABLE | COMMENT (EXPLANATION OF CABLE) |
|---|---|
| LIBRARY TYPE (FOR CABLE, MATERIAL, OR ELSE) ||
| CABLE TYPE (PARALLEL, STRANDED, OR COAXIAL) ||
| CHARACTERISTIC IMPEDANCE OF CABLE ($\Omega$) ||
| TRANSMISSION DELAY TIME OF CABLE (s/m) ||
| CONDUCTOR RESISTANCE OF CABLE ($\Omega$/m) ||
| STRUCTURAL DATA FOR CABLE<br>    PARALLEL CABLE:<br>    CONDUCTOR DIAMETER d,<br>    CONDUCTOR-TO-CONDUCTOR DISTANCE $\delta$<br>    STRANDED CABLE:<br>    CONDUCTOR DIAMETER d,<br>    CONDUCTOR-TO-CONDUCTOR DISTANCE $\delta$,<br>    TWIST PITCH $\psi$ ||

Fig. 3B

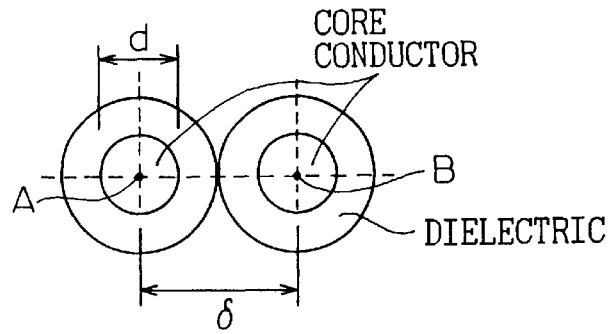

Fig. 3C

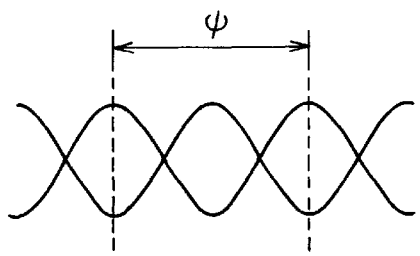

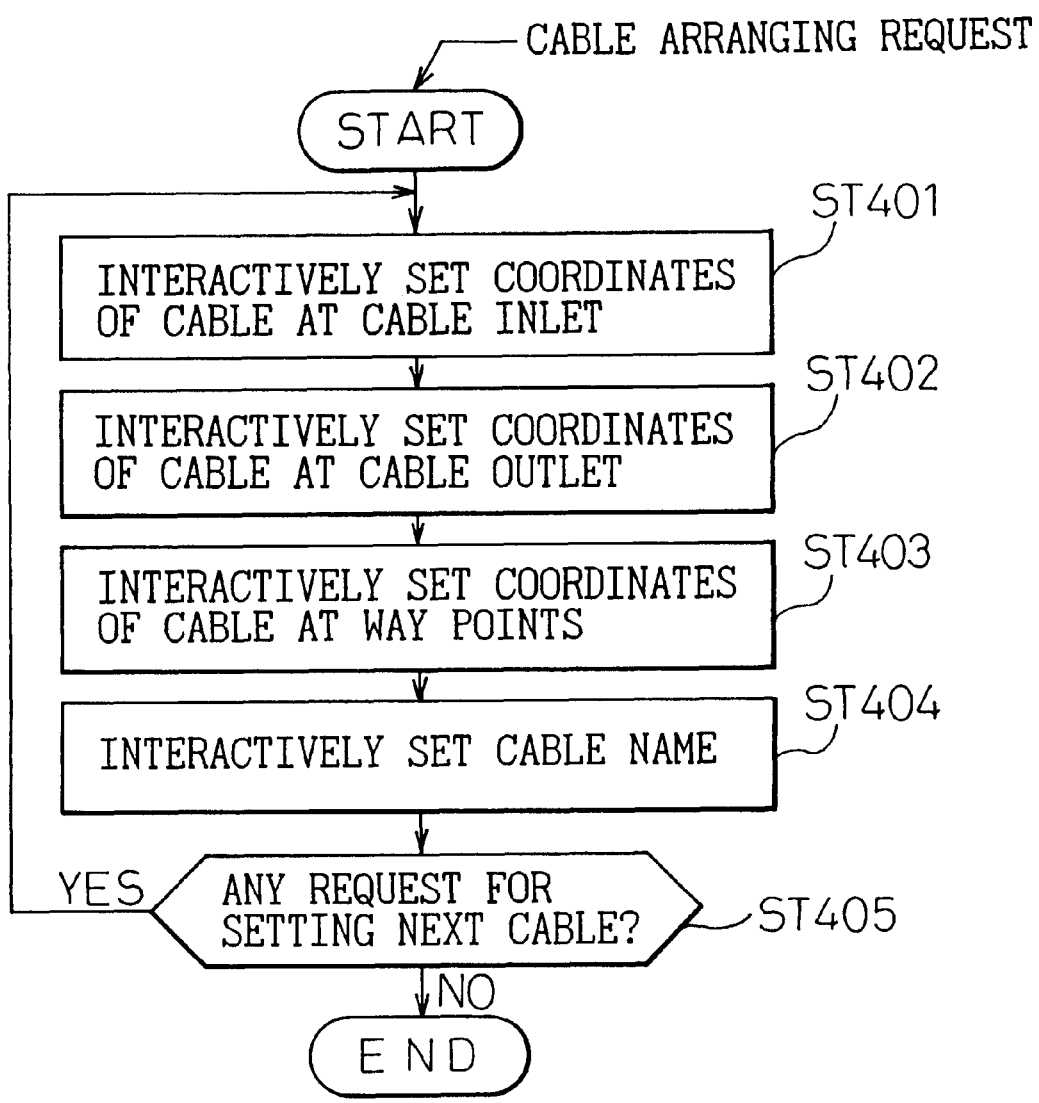

Fig.14A

| |
|---|
| COORDINATES OF POINT ON POSITIVE NORMAL AWAY FROM LINK START POINT BY HALF OF CONDUCTOR-TO-CONDUCTOR DISTANCE |
| COORDINATES OF LINK START POINT (MIDDLE POINT) |
| COORDINATES OF POINT ON NEGATIVE NORMAL AWAY FROM LINK START POINT BY HALF OF CONDUCTOR-TO-CONDUCTOR DISTANCE |
| COORDINATES OF POINT ON POSITIVE NORMAL AWAY FROM LINK END POINT BY HALF OF CONDUCTOR-TO-CONDUCTOR DISTANCE |
| COORDINATES OF LINK END POINT (MIDDLE POINT) |
| COORDINATES OF POINT ON NEGATIVE NORMAL AWAY FROM LINK END POINT BY HALF OF CONDUCTOR-TO-CONDUCTOR DISTANCE |

Fig.14B

| LINK a | LINK b | LINK c |
|---|---|---|
| COORDINATES OF A | COORDINATES OF D | COORDINATES OF G |
| COORDINATES OF C | COORDINATES OF F | COORDINATES OF I |
| COORDINATES OF B | COORDINATES OF E | COORDINATES OF H |
| COORDINATES OF D | COORDINATES OF G | COORDINATES OF J |
| COORDINATES OF F | COORDINATES OF I | COORDINATES OF L |
| COORDINATES OF E | COORDINATES OF H | COORDINATES OF K |

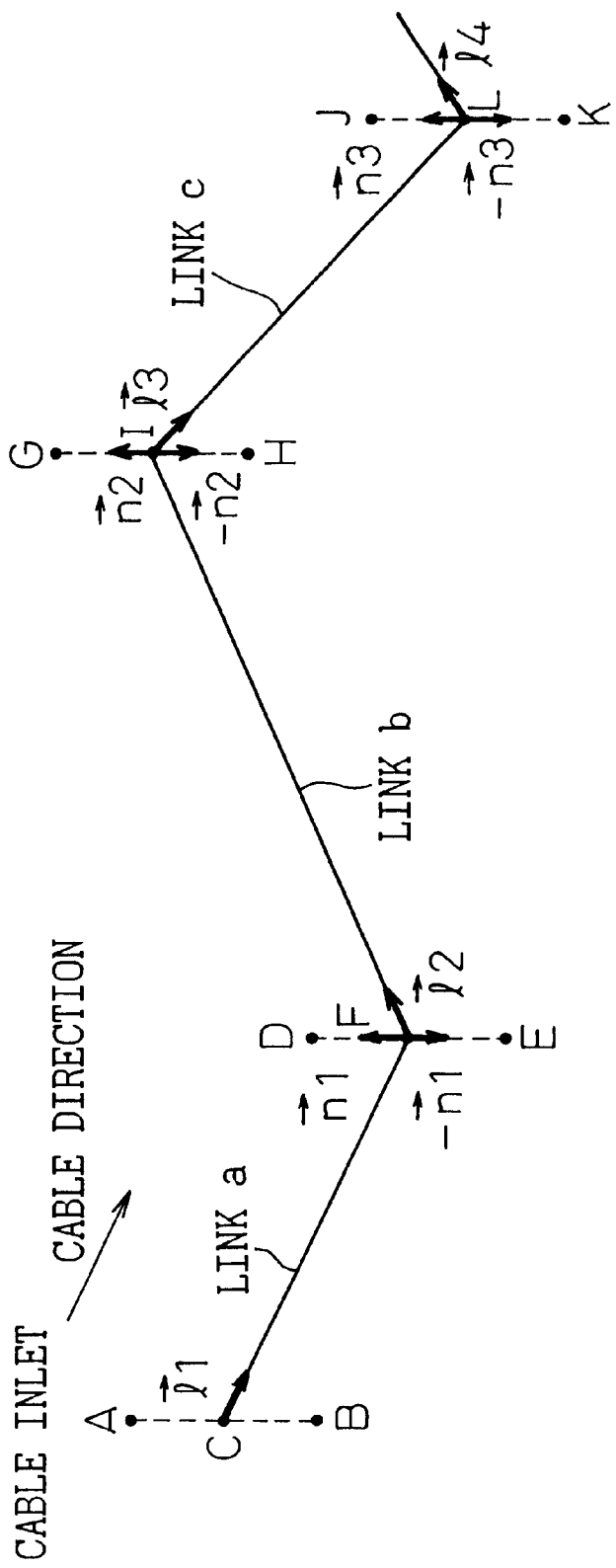

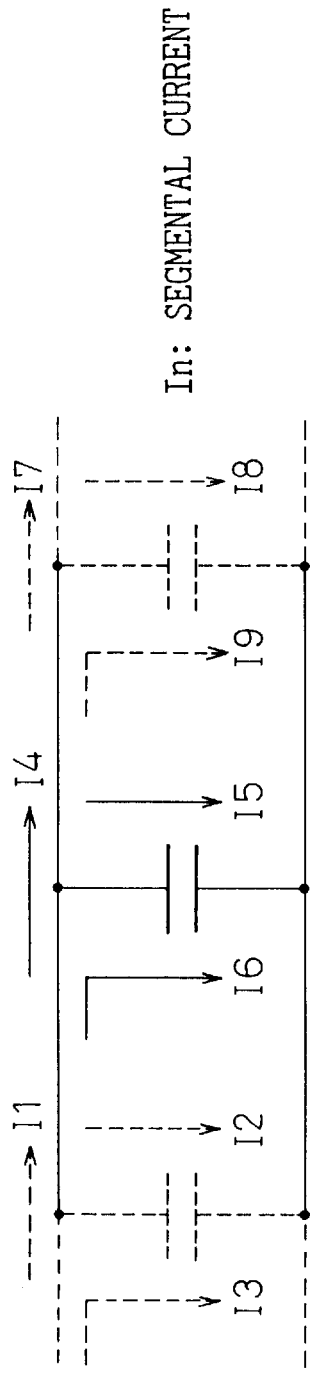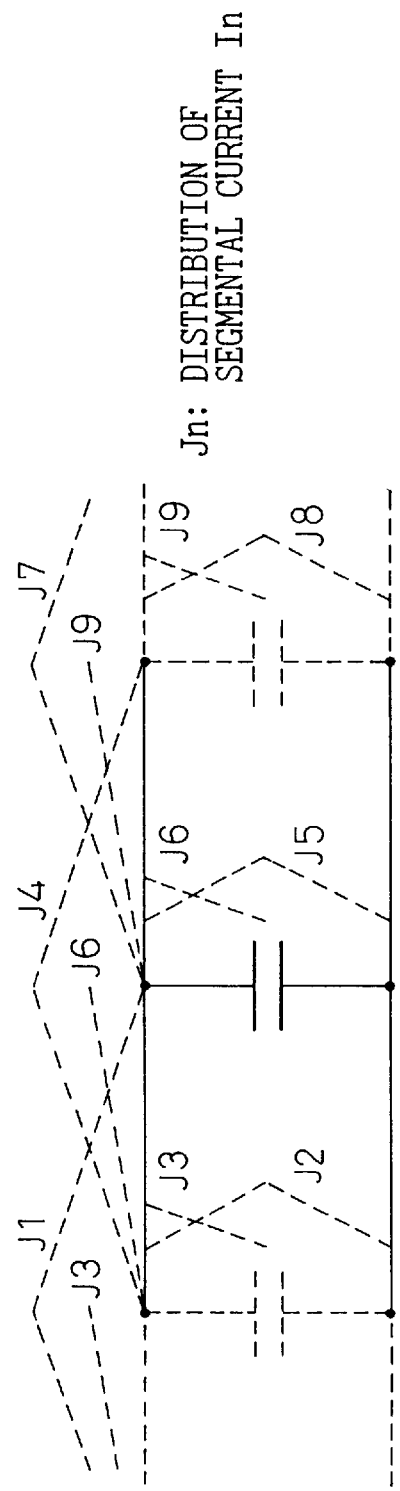

Fig.26

TESTED PARALLEL CABLE

| | |
|---|---|
| NUMBER OF CORE WIRES | : 20 |
| CONDUCTOR DIAMETER | : 0.381mm |
| CONDUCTOR-TO-CONDUCTOR DISTANCE | : 1.27mm |
| CHARACTERISTIC IMPEDANCE | : 174Ω (41MHz) |
| TRANSMISSION DELAY TIME | : 5.628ns |
| CONDUCTOR RESISTANCE | : 0.213Ω/m |

TESTED STRANDED CABLE

| | |
|---|---|
| CONDUCTOR DIAMETER | : 0.26mm |
| CONDUCTOR-TO-CONDUCTOR DISTANCE | : 0.46mm |
| TWIST PITCH | : 9mm |
| CHARACTERISTIC IMPEDANCE | : 112Ω (41MHz) |
| TRANSMISSION DELAY TIME | : 4.912ns |
| CONDUCTOR RESISTANCE | : 0.366Ω/m |

APPARATUS AND METHOD FOR CALCULATING THE STRENGTH OF AN ELECTROMAGNETIC FIELD RADIATED FROM AN ELECTRIC DEVICE

BACKGROUND OF THE INVENTION

1. Field of the Invention

The present invention relates to a method of, and an apparatus for, calculating the strength of an electromagnetic field radiated from an electric device according to a moment method, as well as a medium for storing a program to perform the method. In particular, the present invention relates a method of and an apparatus for precisely calculating, through user-friendly operations, the strength of an electromagnetic field radiated from two-wire cables laid in an electric device, as well as a medium for storing a program to perform the method.

Many countries have severe restrictions on electric devices to prohibit them from radiating radio waves and noise that exceed specific levels.

To meet the restrictions, many shielding and filtering techniques have been developed. These techniques need a technique for quantitatively evaluating the effect thereof.

The present inventors have disclosed several techniques for simulating the strength of an electromagnetic field radiated from an electric device with the use of the moment method. These techniques need a correct model of a target electric device.

2. Description of the Related Art

The strength of an electromagnetic field radiated from an object is simulated by finding electric and magnetic currents flowing through parts of the object and by substituting the currents in known electromagnetic formulae. The electric and magnetic currents flowing through parts of an object are calculable by solving Maxwell's electromagnetic equations under given boundary conditions.

The moment method is based on some integral equations derived from the Maxwell's electromagnetic equations. The moment method divides an object into small elements and calculates electric and magnetic currents flowing therethrough. The moment method is applicable to three-dimensional objects having optional shapes. The moment method is described in, for example, "Sinusoidal Reaction Formulation for Radiation and Scattering from Conducting Surface" by H. N. Wang, J. H. Richmond, and M. C. Gilreath in IEEE Transactions Antennas and Propagation, Vol. AP-23, 1975.

The moment method divides the structure of a target electric device into meshes and selects a frequency. Based on the frequency, the moment method calculates the mutual impedance, mutual admittance, and mutual reaction of the meshes. These data pieces and wave sources specified by structural data of the electric device are substituted for the simultaneous equations of the moment method, to provide electric and magnetic currents flowing through the meshes.

When handling a metal object, the moment method divides the metal object into meshes and finds mutual impedance $Z_{ij}$ of the meshes. Linear equations of the moment method express the mutual impedance $Z_{ij}$, wave sources $V_i$, and currents $I_i$ flowing through the meshes as follows:

$$[Z_{ij}][I_i]=[V_i]$$

where [ ] indicates a matrix. Solving this provides the currents $I_i$ with which the moment method calculates the strength of an electromagnetic field radiated from the metal object.

If the meshes involve resistors, capacitors, and reactance elements, they are added to self-impedance components of the meshes.

Electric devices contain cables to connect two separate points to each other.

Conventional apparatuses and methods for calculating the strength of an electromagnetic field have no user interfaces for handling such cables laid in electric devices. The prior arts treat the cables as fixed parts and create models of the electric devices for the moment method.

These cables, however, have a large degree of freedom in their arrangements. They are bent and twisted between two points to connect, and they radiate strong electromagnetic fields.

The prior arts that treat cables as fixed parts are incapable of properly simulating electromagnetic fields radiated therefrom. The prior arts are also incapable of varying the arrangements of cables to determine the effect thereof.

There are many types of cables such as parallel cables and stranded cables, and there are different standards for these cables.

The prior arts, however, have no standardized theories to model cables, and therefore, must individually cope with a variety of cables whenever they are given. In particular, the prior arts provide no technique for modeling stranded cables. What is needed is a technique of precisely modeling various types of cables.

SUMMARY OF THE INVENTION

An object of the present invention is to provide a method of and an apparatus for precisely calculating, through user-friendly operations, the strength of an electromagnetic field radiated from an electric device, in particular, two-wire cables laid in the electric device according to the moment method. The present invention also provides a medium for storing a program that is readable by a computer to perform the method.

In order to accomplish the objects, the present invention provides an apparatus for calculating the strength of an electromagnetic field radiated from an electric device according to the moment method. The apparatus has a setting unit for interactively setting the name of a two-wire cable arranged in the electric device and the coordinates of the two-wire cable at a cable inlet, a cable outlet, and way points in the electric device, the way points being prepared as and when required to bend the cable between the cable inlet and the cable outlet; libraries corresponding to cable names, respectively, and storing each the attributes of a corresponding cable including at least the name, type, characteristic impedance, and structural data of the cable; a generation unit for generating a model of the two-wire cable for the moment method, according to the attributes of the two-wire cable read out of one of the libraries corresponding to the name of the two-wire cable set by the setting unit and the coordinates of the cable at the cable inlet, cable outlet, and way points set by the setting unit; and a calculation unit for calculating the strength of an electromagnetic field radiated from the electric device according to the model and moment method.

The present invention also provides a method of calculating the strength of an electromagnetic field radiated from an electric device according to a moment method. The method includes the steps of storing, in each of libraries corresponding to cable names, respectively, the attributes of a corresponding cable including at least the name, type, characteristic impedance, and structural data of the cable; interactively setting the name of a two-wire cable arranged in the electric device and the coordinates of the two-wire cable at a cable inlet, a cable outlet, and way points in the electric device, the way points being prepared as and when required to bend the cable between the cable inlet and the cable outlet; generating a model of the two-wire cable for the moment method, according to the attributes of the two-wire cable retrieved from one of the libraries by the set name of the two-wire cable and the set coordinates of the cable at the cable inlet, cable outlet, and way points; and calculating the strength of an electromagnetic field radiated from the electric device according to the model and moment method.

The present invention further provides a medium for storing a program that makes a computer execute the method.

The present invention calculates the strength of an electromagnetic field radiated from an electric device according to the moment method and a model of the electric device. The present invention is capable of modeling two-wire cables in the electric device not only in an actual arrangement but also in various arrangements to evaluate the effect of each arrangement.

The present invention models each parallel or stranded cable installed in an electric device into a ladder circuit made of metal lines and capacitors, to precisely calculate the strength of an electromagnetic field radiated from the electric device.

BRIEF DESCRIPTION OF THE DRAWINGS

The above objects and features as well as other features of the present invention will be more apparent from the following description of the preferred embodiments when read in conjunction with the accompanying drawings, wherein:

FIG. 3A is a table showing the structure of a cable data library;

FIG. 3B is a sectional view showing two conductors of a cable;

FIG. 3C shows a twist pitch of a stranded cable;

FIG. 4 is a flowchart illustrating interactively setting the coordinates of a cable at a cable inlet, in accordance with an exemplary embodiment the present invention;

FIGS. 13, 14A, and 14B explain link data;

FIG. 15 explains normal vectors;

FIGS. 24A and 24B explain segmental currents;

FIGS. 25A, 25B, 25C, and 26 explain verification tests; and

DESCRIPTION OF THE PREFERRED EMBODIMENTS

Figure 1:
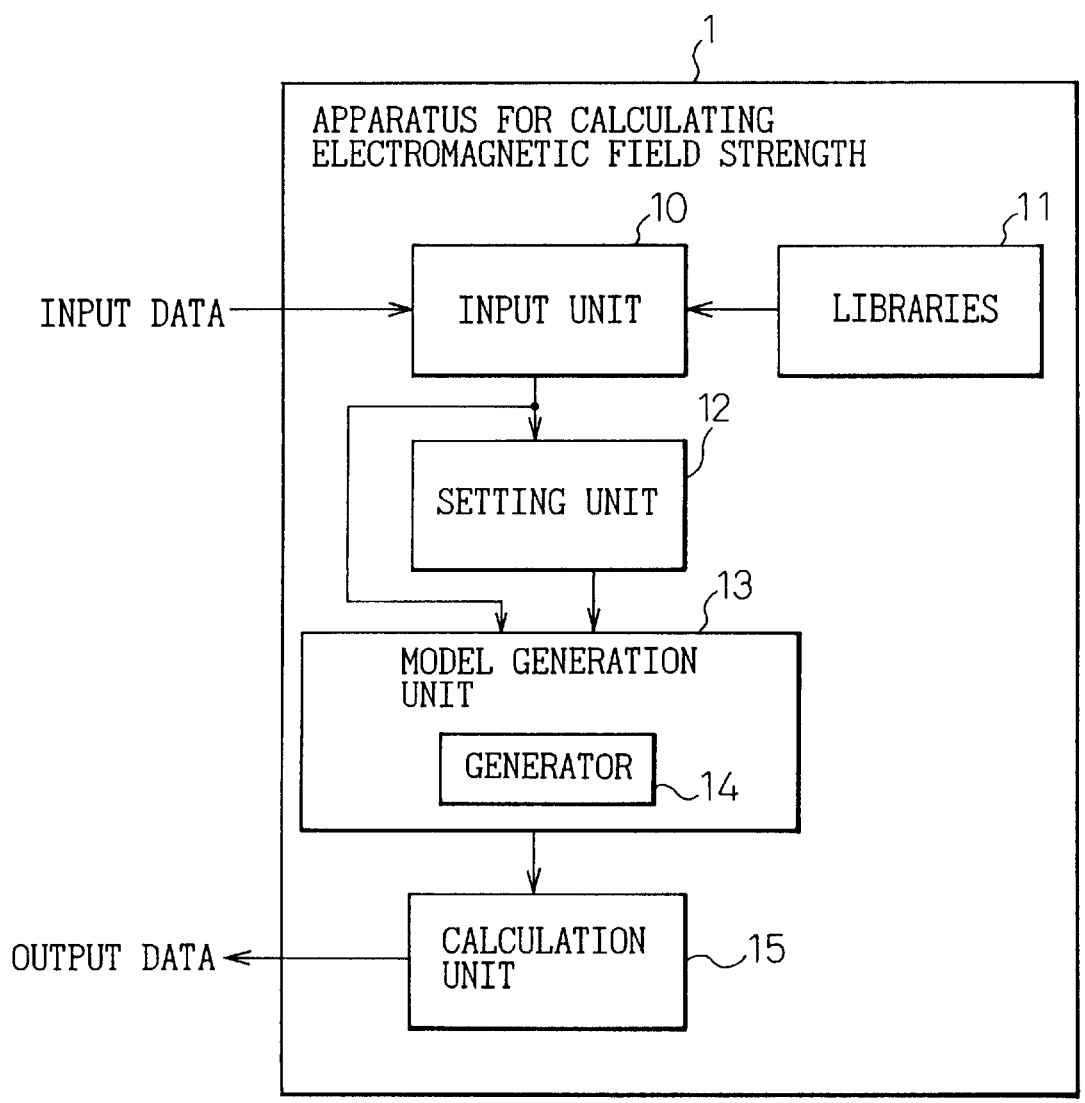
FIG. 1 shows a principle structure according to the present invention.

FIG. 1 shows a basic structure of an apparatus for calculating the electromagnetic field radiated from an electric device, according to the present invention.

The apparatus 1 employs the moment method to calculate the strength of an electromagnetic field.

The apparatus 1 has an input unit 10, libraries 11, a setting unit 12, a model generation unit 13, a generator 14, and a calculation unit 15.

The input unit 10 receives structural data for an electric device to analyze. In the electric device, a target of the present invention is a parallel or stranded two-wire cable. Accordingly, the input unit 10 receives structural data such as the name, type (parallel or stranded), characteristic impedance, conductor diameter, conductor-to-conductor distance, and twist pitches (if the cable is stranded) of the cable.

The libraries 11 are prepared for cable names, respectively. Each of the libraries 11 stores the attributes of a corresponding cable such as the name, type, characteristic impedance, and structure of the cable.

The setting unit 12 interactively sets the name of the target cable and the coordinates of the target cable at a cable inlet, a cable outlet, and way points in the electric device. The way points are prepared as and when required to bend the cable between the cable inlet and the cable outlet in the electric device.

The data to be set in the setting unit 12 may be provided through the input unit 10 or directly through an interactive operation.

The model generation unit 13 generates a moment-method model of the target cable according to attributes read out of one of the libraries 11 that has the name of the target cable and the coordinates of the cable at the cable inlet, cable outlet, and way points set by the setting unit 12.

The calculation unit 15 calculates the strength of an electromagnetic field radiated from the electric device according to the model and moment method.

The functions of the apparatus 1 are actually realized by a program, which is stored in a floppy disk or a server disk. The program in the disk is installed to a memory of the apparatus 1 and is executed to materialize the effect of the present invention.

When the input unit 10 receives structural data for an electric device, the setting unit 12 interactively sets way points to pass a target two-wire cable in the electric device and determines the positions of the cable.

If the target cable is a stranded cable, two core conductors thereof must have the same length. To secure this, the generator 14 adjusts the twist pitches of the stranded cable so that each of the way points serving to change the direction of the cable may meet a loop of the cable. The generator 14 determines core conductor positions of the cable at each way point according to the changed twist pitches and specified twist angles. The generator 14 traces the core conductor positions with lines for each section of the cable through which the direction of the cable is unchanged. The generator 14 inserts capacitors between the lines of each section of the cable, to form a model of the cable for the moment method.

If the cable has torsion in any section of the cable, the generator 14 corrects twist angles of the cable to cancel the torsion when generating lines to form the model.

To arrange a loop of a stranded cable at a way point, the setting unit 12 may adjust the positions of way points instead of changing twist pitches of the cable by the generator 14.

If the target two-wire cable is a parallel cable, the generator 14 divides each section of the cable through which the direction of the cable is unchanged into segments having a specified or shorter length, plots core conductor positions of the cable on the segments, traces the core conductor positions with lines, and inserts capacitors between the lines, to thereby form a model of the cable for the moment method.

If any section of the cable involves torsion between the start and end of the section, the generator 14 plots core conductor positions of the cable on the segments of the section in consideration of the torsion and traces the core conductor positions with lines when generating a model of the cable for the moment method.

The generator 14 employs formulae to find the inductance and capacitance of a unit length of the cable on condition that the core conductors of the cable are bare in air, calculate the characteristic impedance of the cable in air according to the found inductance and capacitance, and find the capacitance of the unit length of the cable according to the calculated characteristic impedance and the characteristic impedance contained in the attributes of the cable retrieved from one of the libraries 11. Then, the generator 14 determines the capacitance of each of the capacitors to form the model according to the found capacitance of the unit length of the cable and the number of the segments.

In this way, the apparatus 1 employs the moment method to calculate the strength of an electromagnetic field radiated from an electric device. The apparatus 1 allows two-wire cables installed in the electric device to be freely arranged. The apparatus 1 is capable of simulating not only an actual arrangement of the cables but also other arrangements of the cables to test the effect of these arrangements.

The apparatus 1 is capable of precisely modeling parallel and stranded cables installed in an electric device into ladder circuits made of metal lines and capacitors, to correctly calculate the strength of an electromagnetic field radiated from the electric device.

Now, embodiments of the present invention will be explained.

Figure 2:
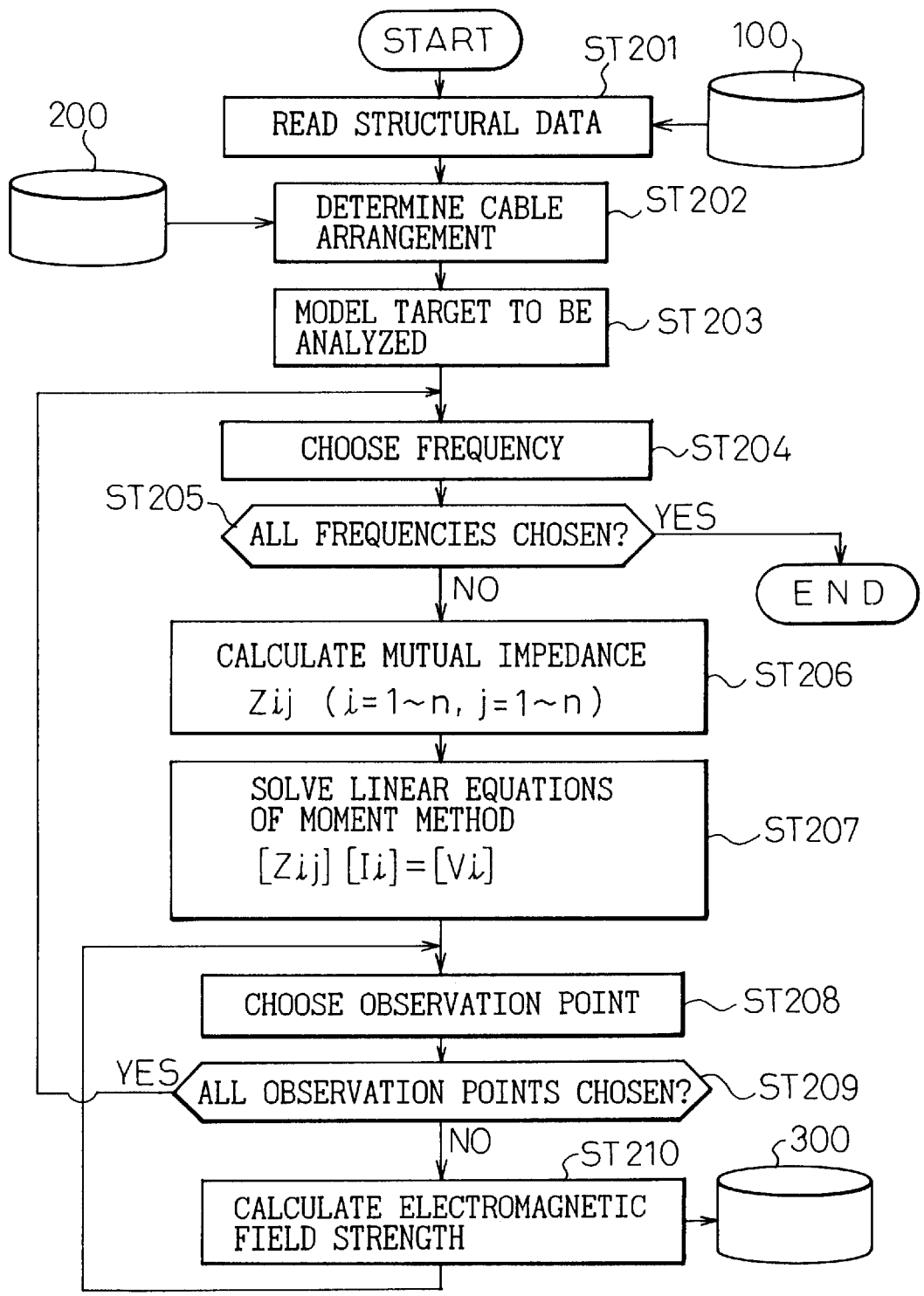
FIG. 2 is a flowchart illustrating a cable modeling process to calculate the strength of an electromagnetic field, in accordance with an exemplary embodiment of the present invention.

FIG. 2 is a flowchart showing processing steps of the embodiment carried out by the apparatus 1 for calculating the strength of an electromagnetic field. The flowchart includes an input data file 100 for storing structural data for an electric device to analyze, a cable library 200 for storing attributes about two-wire cables contained in the electric device, and an output data file 300 for storing a calculation result of the strength of an electromagnetic field.

A program for performing the processing steps is stored in a floppy disk or a server disk from which the program is installed to the apparatus 1 and is executed in a memory thereof.

The apparatus 1 has a terminal unit (not shown) serving as a user interactive device.

Step ST201 reads structural data for the electric device from the input data file 100. The structural data includes, for example, the name, type (parallel or stranded), characteristic impedance, conductor diameter, conductor-to-conductor distance, and twist pitches of each two-wire cable contained in the electric device. Instead of reading the structural data from the input data file 100, the same will directly be entered by a user through an interactive action in step ST202.

Step ST202 uses the cable name as a key to retrieve the attributes of the cable from the library file 200, and according to the attributes, determines an arrangement of the cable.

Step ST203 uses the structural data and the cable arrangement made in step ST202, divides the electric device into meshes, and forms a model of the electric device for the moment method.

Step ST204 chooses an electromagnetic field frequency not processed yet. Step ST205 determines whether or not all frequencies have been chosen. If all frequencies have been chosen, the flow ends.

If step ST204 successfully chooses a frequency, step ST206 employs Green function to calculate mutual impedance Zij (i=1 to n, j=1 to n) among the meshes. For the sake of simplicity of explanation of the embodiment, the object to be analyzed is metal, and only the mutual impedance is calculated.

Step ST207 employs the mutual impedance Zij calculated in step ST206 and voltages Vi of wave sources contained in the structural data, to solve the following linear equation of the moment method:

$$[Zij][Ii]=[Vi]$$

Then, current Ii passing through each meshed metal element is calculated.

Step ST208 chooses an observation point not processed yet. Step ST209 determines whether or not all observation points have been chosen. If all observation points have been chosen, the flow returns to step ST204 to process the next frequency.

If step ST208 successfully chooses an observation point, step ST210 calculates the strength of an electromagnetic field caused by the currents Ii on the observation point. A result of the calculation is stored in the output data file 300, and the flow returns to step ST208 to process the next observation point.

In this way, the apparatus 1 calculates the strength of an electromagnetic field radiated from the electric device according to the moment method.

FIG. 3A shows data structure in the cable library 200.

The cable library 200 stores the attributes of a cable arranged in the electric device. The attributes include the name, characteristic impedance, and type (parallel, stranded, or coaxial) of the cable. If the cable is a parallel cable, the attributes also include a conductor diameter d and a conductor-to-conductor distance δ shown in FIG. 3B. If the cable is a stranded cable or, in other words, a twisted cable, the attributes include, in addition to the conductor diameter d and conductor-to-conductor distance δ, a twist pitch ψ (positive if clockwise, negative if counterclockwise) shown in FIG. 3C. The twist pitch ψ is a length within which the stranded cable makes a turn. In FIG. 3B, reference marks A and B represent the centers of two conductors of the cable.

Figure 5:
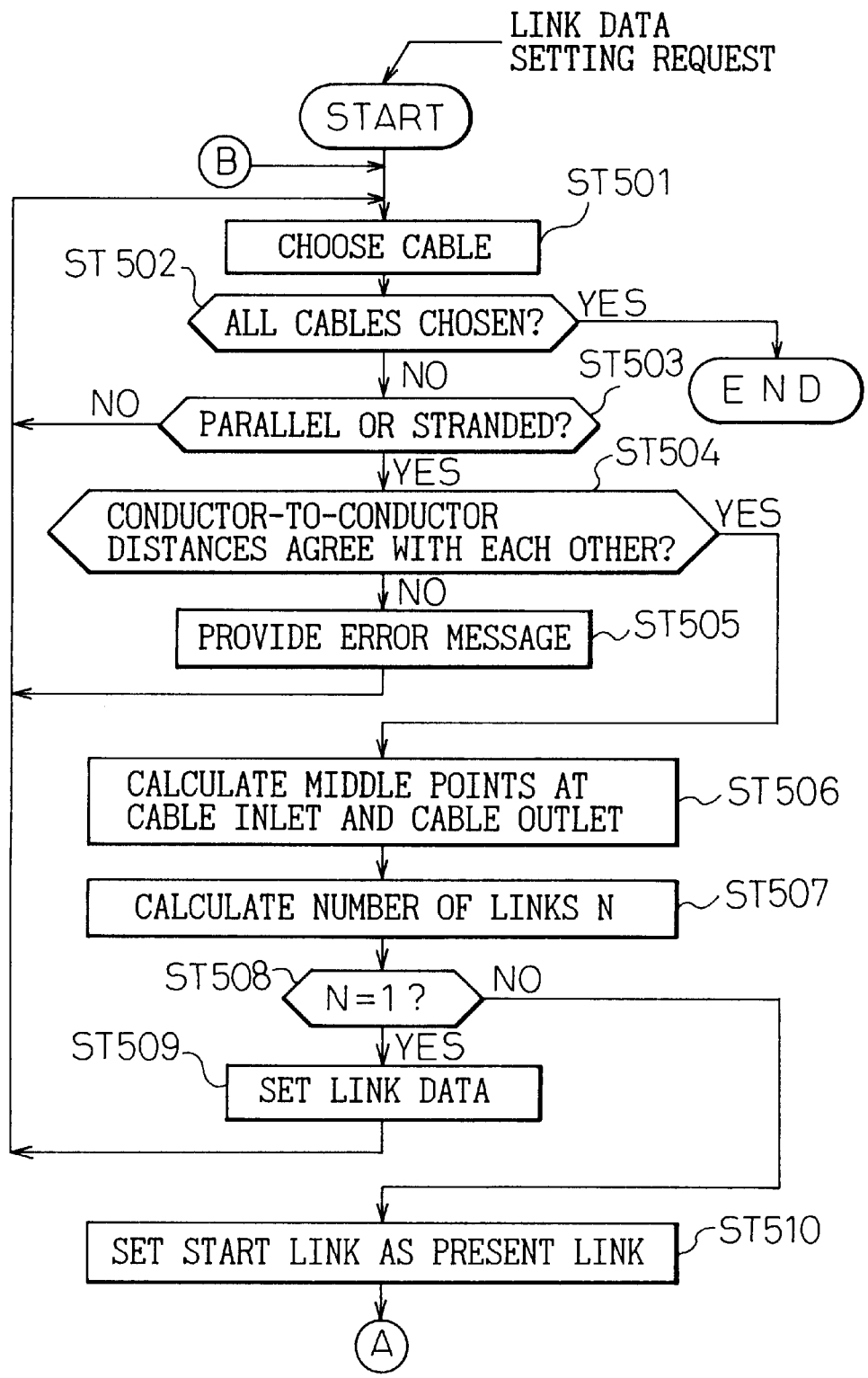
FIG. 5 is a flowchart illustrating a link data determining process, in accordance with the present invention.
Figure 6:
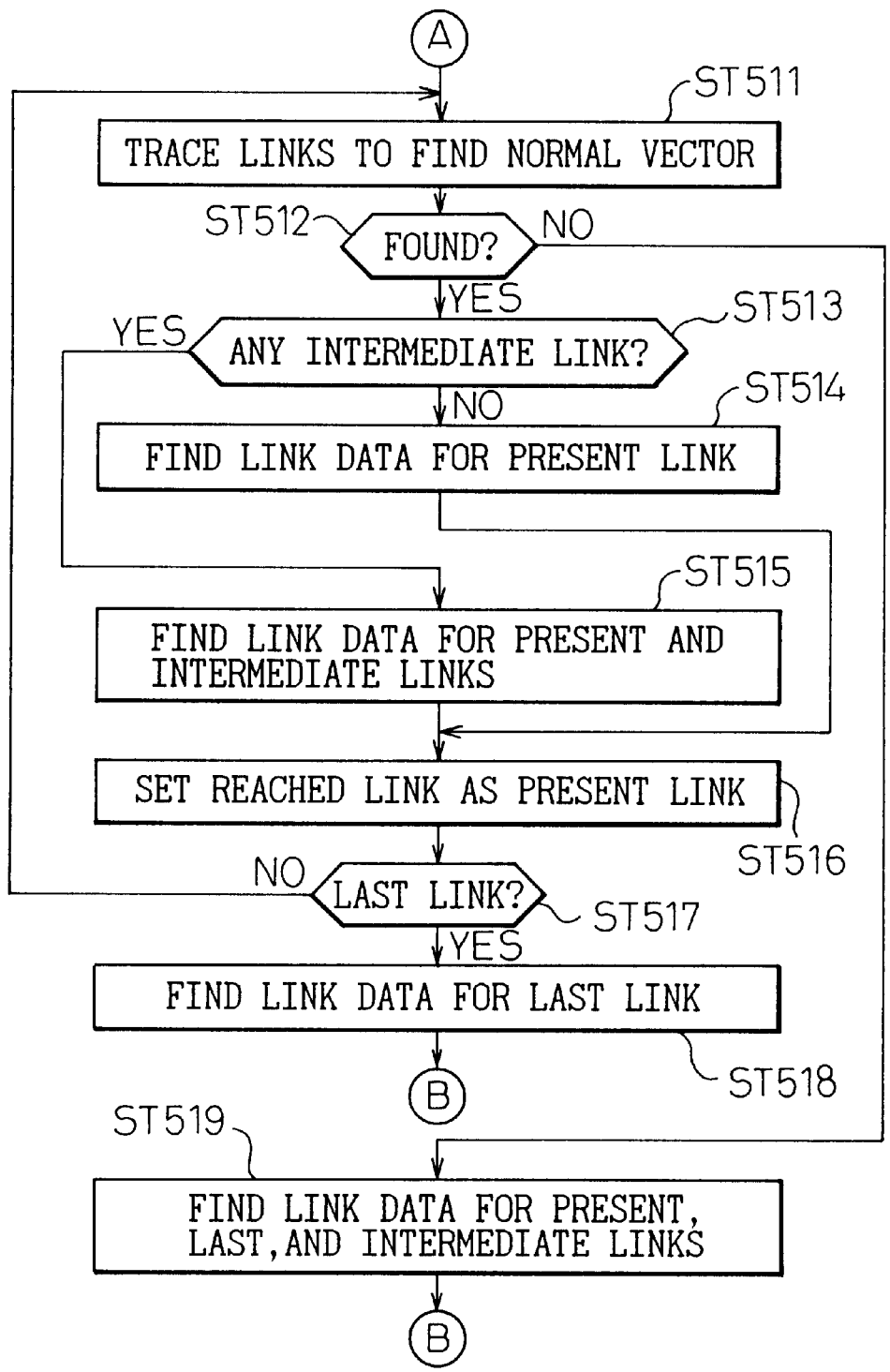
FIG. 6 is a flowchart illustrating a continuation of the link data determining process of FIG. 5, in accordance with an exemplary embodiment the present invention.

FIGS. 4 to 6 are flowcharts showing the details of the cable arrangement determining process of step ST202 of FIG. 2, and FIGS. 7 to 9 are flowcharts showing the details of the cable modeling process of step ST203 of FIG. 2. The details of these processes will be explained.

The cable arrangement determining process consists of a cable arranging process that is interactively carried out, and a link data determining process carried out according to a result of the cable arranging process.

The cable arranging process of FIG. 4 is carried out at the start of step ST202 of FIG. 2.

Step ST401 of FIG. 4 interactively sets the coordinates of the cable at a cable inlet. Step ST402 interactively sets the coordinates of the cable at a cable outlet. Here, the coordinates of the cable means the coordinates of the center of each of the two conductors of the cable.

Step ST403 interactively determines the coordinates of each way point. The way points are set between the cable inlet and the cable outlet and serve to change the direction of the cable. The coordinates of each way point are used to determine the coordinates of each conductor of the cable at the way point. If no way point is set, the cable is straight between the cable inlet and the cable outlet.

Step ST404 interactively sets the name of the cable registered in the cable library 200, thus determining the cable to use. Step ST405 determines whether or not there is a request to set the next cable. If there is, the flow returns to step ST401, and if not, the cable arranging process ends.

The coordinates of the cable at the cable inlet and cable outlet are sometimes registered in the input data file 100 in advance. In this case, the user retrieves the data from the input data file 100 and sets the same. Thereafter, the coordinates of way points are interactively set.

Figure 10A:
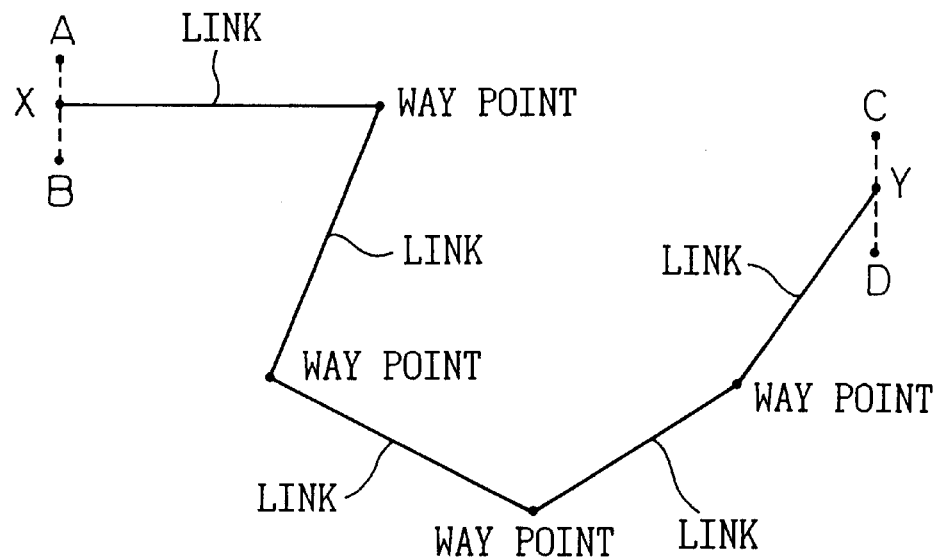
FIGS. 10A and 10B explain an arrangement of a cable.
Figure 10B:
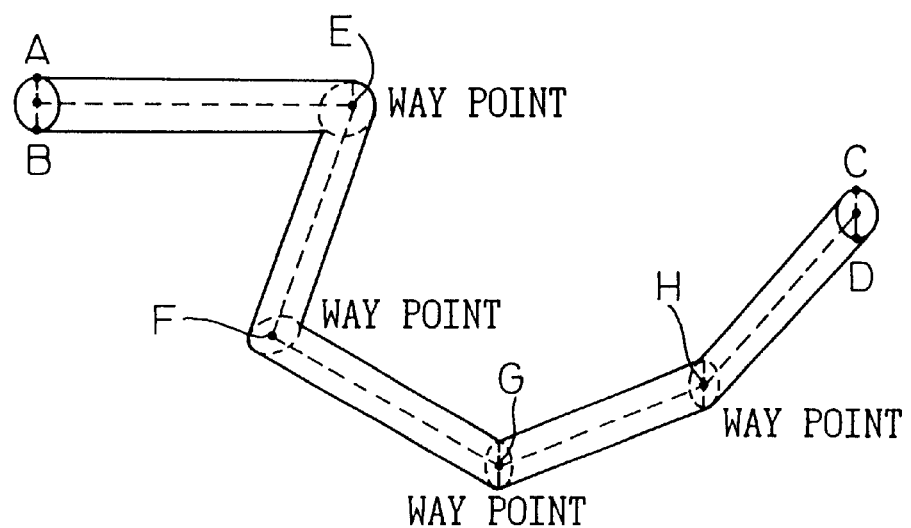

In this way, the apparatus 1 interactively arranges, in the cable arranging process, the cable in the electric device which is a target to be analyzed, as shown in FIG. 10A. The cable of FIG. 10A actually has a thickness as shown in FIG. 10B. Reference marks A and B correspond to conductor positions of the cable at the cable inlet, and C and D to those at the cable outlet. Reference marks E, F, G, and H are way points.

In FIG. 10A, a continuous line between adjacent way points is a "link." The links run along a cable axis that runs through the middle of the two conductors of the cable. Each link has a start point on the cable inlet side and an end point on the cable outlet side.

Figure 11:
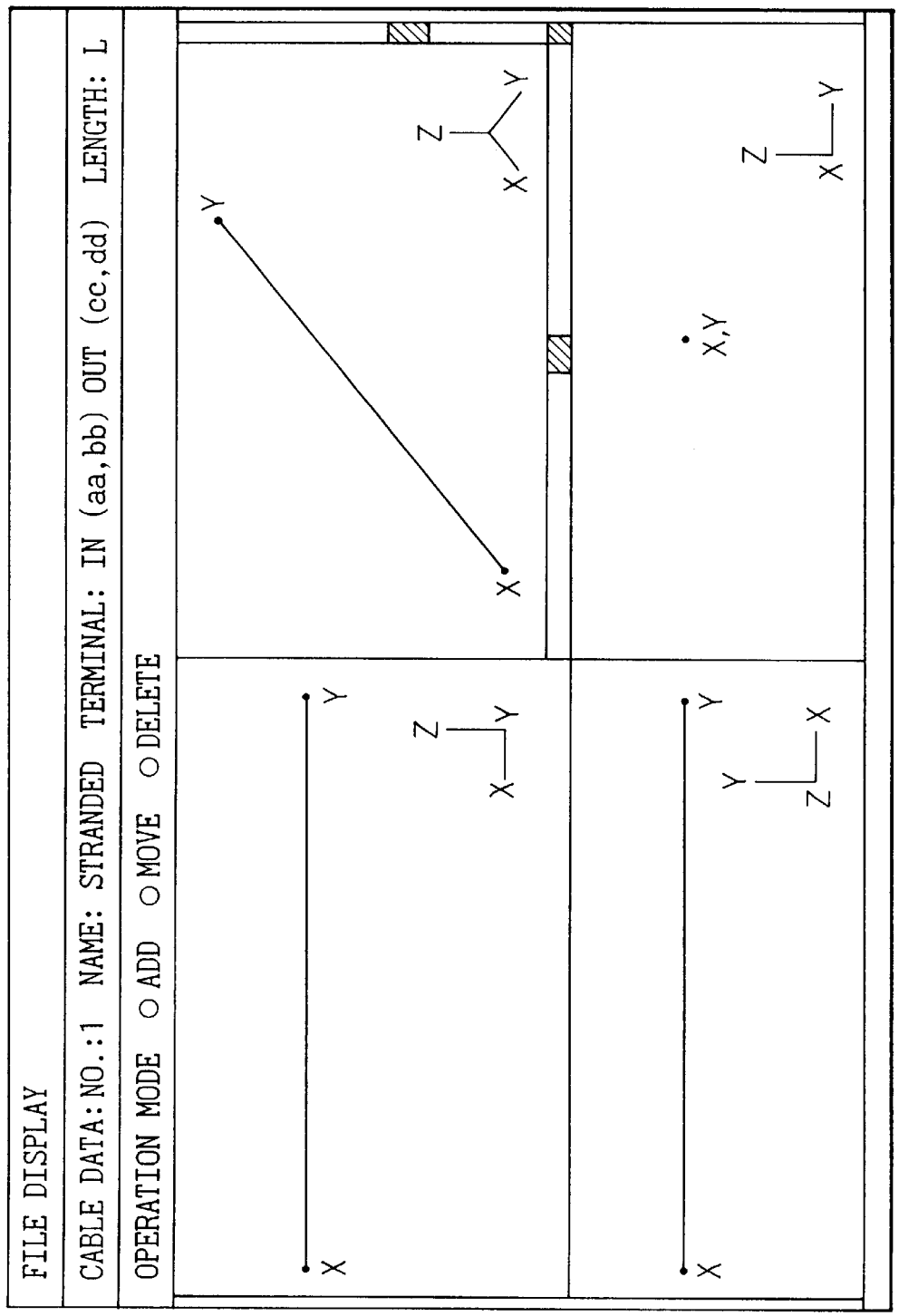
FIGS. 11 and 12 show display screens according to the present invention.
Figure 12:
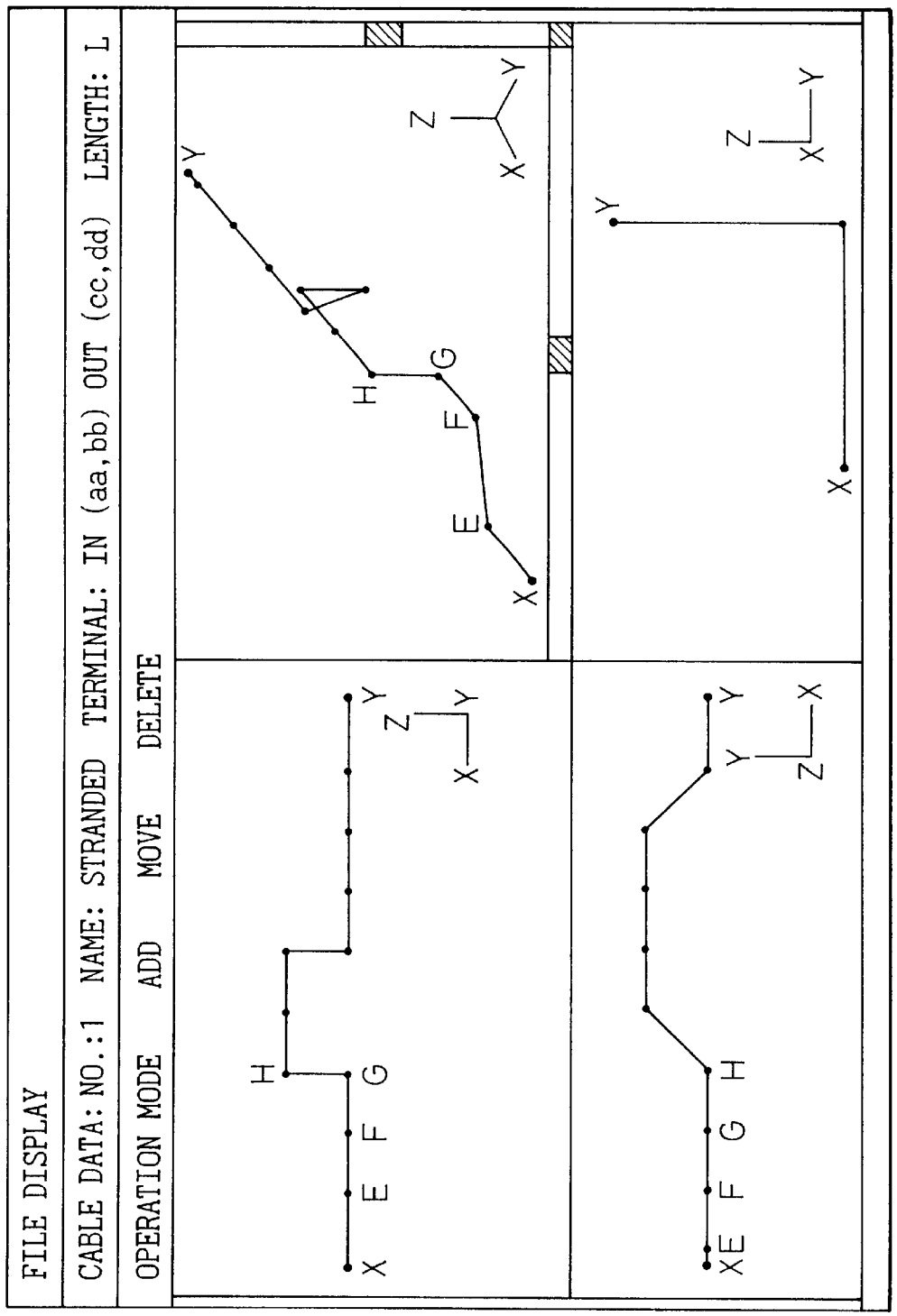

FIGS. 11 and 12 show examples of display screens used to set the coordinates of each way point.

The apparatus 1 lets the user to correctly grasp the three-dimensional positions of the cable at the cable inlet, cable outlet, and way points. For this purpose, each screen has a lower left section for displaying an XY plane, an upper left section for an XZ plane, a lower right section for a YZ plane, and an upper right section for a three-dimensional view. The screen of FIG. 11 is used to set the coordinates of a cable at a cable inlet and cable outlet in an electric device, and the screen of FIG. 12 is used to set the coordinates of way points such as E, F, G, and H.

In this way, the cable arranging process interactively sets the coordinates of the cable at the cable inlet, cable outlet, and way points, as well as the name of the cable. Thereafter, the apparatus 1 carries out the link data determining process.

The link data of a link includes the coordinates of each end of the link. More precisely, the link data of a link includes the coordinates of way points related to the link and the coordinates of conductor positions corresponding to the way points.

The coordinates of a way point at the cable inlet is in the middle of the coordinates of the conductor positions A and B. The coordinates of a way point at the cable outlet is in the middle of the coordinates of conductor positions at the cable outlet.

The coordinates of conductor positions of the cable at a way point are on positive and negative sides of a normal line that crosses, at the way point, orthogonally to a corresponding link. Each of these conductor positions is set oppositely away from the way point by half the conductor-to-conductor distance.

Figure 13:
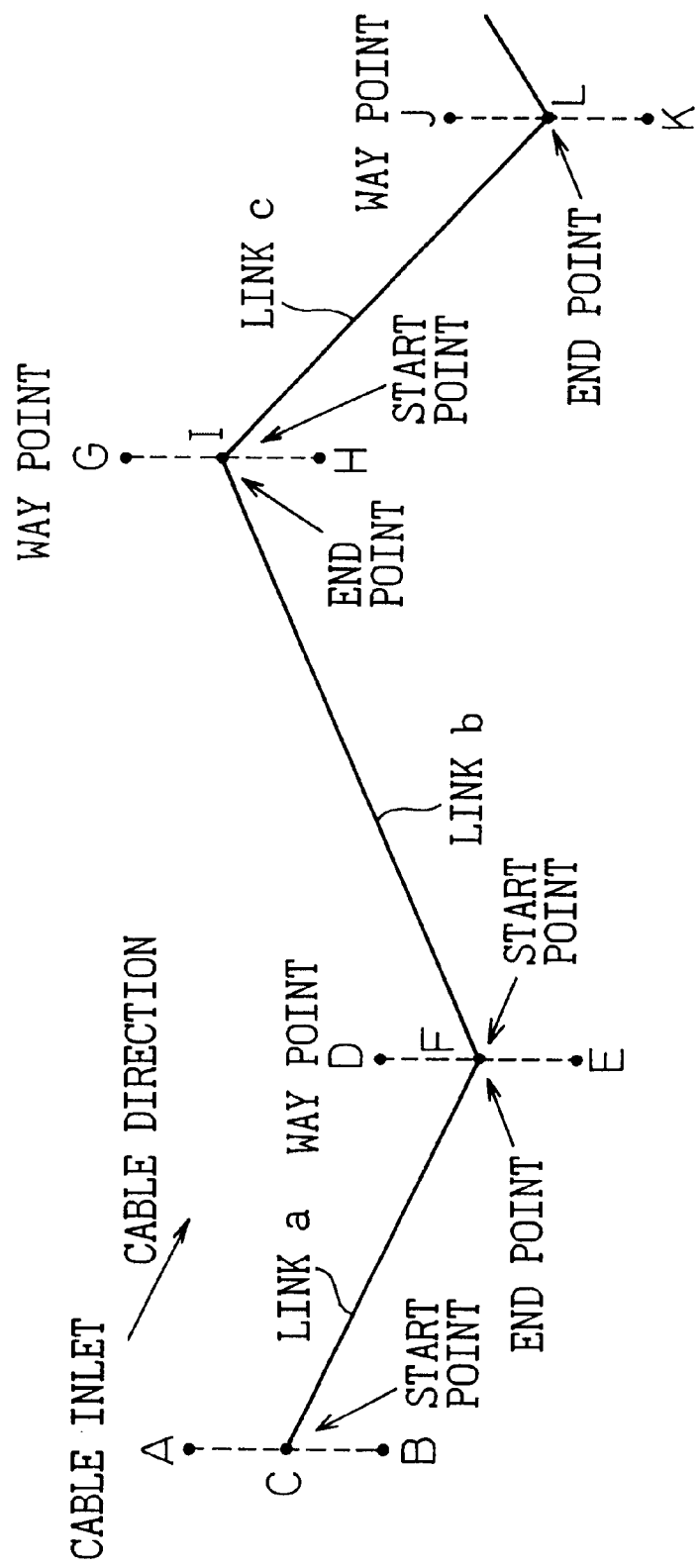

For example, FIG. 13 shows conductor positions A and B for a way point C, and conductor positions D and E for a way point F.

The cable of FIG. 13 is divided into links a, b, c, and the like. FIG. 14A shows an example of link data. The link data consists of start point data and end point data. The start point data includes a coordinate of the start point of the link, a coordinate of a point that is on the positive side of the corresponding normal line, and is set away from the start point by half the conductor-to-conductor distance δ, and a coordinate of a point that is on the negative side of the normal line and is set away from the start point by half the conductor-to-conductor distance δ. Similarly, the end point data includes a coordinate of the end point of the link, a coordinate of a point that is on the positive side of the corresponding normal line and is set away from the end point by half the conductor-to-conductor distance δ, and a coordinate of a point that is on the negative side of the normal line and is set away from the end point by half the conductor-to-conductor distance δ. Here, a positive side of a normal line is a side determined by the right-hand-system vector product of unit vectors of adjacent two links. For example, in FIG. 15, a unit vector $\vec{l}1$ of the link a and a unit vector $\vec{l}2$ of the link b provide a vector product $\vec{l}1 \times \vec{l}2$ to determine a vector $\vec{n}1$, which indicates the positive direction of the normal line.

FIG. 14B shows examples of link data. Link data for the link a includes the coordinates of the conductor position A that is on the positive side of a normal crossing the start point C and is away from the start point C by half the conductor-to-conductor distance δ, the coordinates of the start point C, the coordinates of the conductor position B that is on the negative side of the normal and is away from the start point C by half the conductor-to-conductor distance δ, and the coordinates of the positions D, F, and E related to the end point F. Similarly, link data for the link b includes the coordinates of the positions D, F, E, G, I, and H, and link data for the link c includes the coordinates of the positions G, I, H, J, L, and K.

After the cable arranging process determines the cable inlet, cable outlet, and way points, the link data determining process of the flowcharts of FIGS. 5 and 6 starts. Step ST501 chooses a target cable among the cables arranged in the electric device. Step ST502 checks to see if all cables have been chosen. If all cables have been chosen, the link data determining process ends.

If step ST501 successfully chooses a target cable, step ST502 determines that some cables are left to be selected, and step ST503 uses the name of the target cable as a key to refer to the cable library 200 and determines whether the target cable is parallel or stranded. If the cable is none of them, i.e., if the cable is not a two-wire cable, a modeling process based on another algorithm for, for example, a coaxial cable must be carried out, and the flow returns to step ST501.

If step ST503 determines that the target cable is a parallel or stranded cable, step ST504 uses the name of the cable as a key to access the cable library 200 and reads a conductor-to-conductor distance δ of the cable. Step 504 determines whether or not the read conductor-to-conductor distance agrees with the conductor-to-conductor distance set by the cable arranging process, according to the coordinates of conductor positions of the cable at the cable inlet and cable outlet. If they disagree with each other, step ST505 provides an error message, and the flow returns to step ST501.

If step ST504 determines that they agree with each other, step ST506 calculates the coordinates of a middle point between the two conductor positions at each of the cable inlet and cable outlet. In FIG. 10A, step ST506 calculates the coordinates of the middle point X between the conductor positions A and B at the cable inlet, and the coordinates of the middle point Y between the conductor positions C and D at the cable outlet.

Step ST507 adds "1" to the number of the way points, to determine the number of links of the target cable between the cable inlet and the cable outlet as N. Step ST508 checks to see if N=1. If N=1, there are no intermediate way points. In this case, step ST509 sets the coordinates of the cable at the cable inlet and cable outlet set in the cable arranging process and the coordinates of the middle points set in step ST506 as link data for the target cable. Then, the flow returns to step ST501.

If step ST508 determines that the number of links is 2 or more, step ST510 sets a first link that extends from the cable inlet as a present link. Step ST511 of FIG. 6 searches, starting from the present link, for a link that has a different directional vector from the present link, and finds a normal vector related to the searched link.

As explained with reference to FIGS. 13 and 14, link data contains the coordinates of way points and the coordinates of conductor positions related to the way points. Each conductor position is away from the related way point in positive or negative direction along a normal that crosses the way point by half the conductor-to-conductor distance. A normal vector is determined as the outer product, as shown in FIG. 15, of a directional vector $\vec{l}1$ of a link i and a different directional vector $\vec{l}j$ of a link j that is adjacent to the link i. Accordingly, step ST511 traces links until a link that provides a normal vector is reached.

Step ST512 checks to see if a link that provides a normal vector has been reached. If such a link has been reached, step ST513 determines whether or not there is any link between the present and reached link. If there is no intermediate link, step ST514 obtains the normal vector and prepares link data for the present link.

More precisely, the normal vector is set at the end point of the present link, and the coordinates of conductor positions each being on the normal vector and away from the end point by half the conductor-to-conductor distance are found to complete link data for the end point of the present link. Then, link data for the start point of the present link is found. If the present link is the first link, the coordinates of conductor positions at the cable inlet and the coordinates of the middle point found in step ST506 are copied as the link data for the start point of the present link. If the present link is not the first link, link data for an end point of the preceding link is copied as the link data for the start point of the present link. The coordinates of an intermediate point of any link data is equal to those of a corresponding way point, and therefore, is obtainable by copying the coordinates of the way point.

Step ST514 will be explained in detail with reference to FIG. 15. It must be noted that the coordinates of each of the points A, B, C, F, I, and L are already known.

According to the coordinates of the points C, F, and I, positive and negative normal vectors $\vec{n}1$ and $-\vec{n}1$ passing through the point F and orthogonal to a directional vector $\vec{l}1$ of the link a and a directional vector $\vec{l}2$ of the link b are found. Here, $\vec{n}1=-(-\vec{n}1)$. The coordinates of a point D are found from the coordinates of the point F, the normal vector $\vec{n}1$, and half the conductor-to-conductor distance. The coordinates of a point E are found from the coordinates of the point F, the normal vector $-\vec{n}1$, and half the conductor-to-conductor distance. This completes link data for the link a.

According to the coordinates of the points F, I, and L, positive and negative normal vectors $\vec{n}2$ and $-\vec{n}2$ passing through the point I and orthogonal to the directional vector $\vec{l}2$ of the link b and a directional vector $\vec{l}3$ of the link c are found. Here, $\vec{n}2=-(-\vec{n}2)$. The coordinates of a point G are found from the coordinates of the point I, the normal vector $\vec{n}2$, and half the conductor-to-conductor distance. The coordinates of a point H are found according to the coordinates of the point I, the normal vector $-\vec{n}2$, and half the conductor-to-conductor distance. This completes link data for the link b.

Link data for the link c is similarly found.

If step ST513 determines that there is a link (or links) between the present link and the reached link, the intermediate link has the same directional vector as the present link. Then, step ST515 finds normal vectors, to provide link data for the present link as well as link data for the intermediate link.

More precisely, normal vectors at a start point of the reached link are found. These normal vectors are used for the end point of the present link. The same normal vectors are used for each of the start and end points of the intermediate link. Then, the coordinates of each point away from the start and end points of the link by half the conductor-to-conductor distance are found. The link data for the start point of the present link including the coordinates of the middle point are prepared by copying as mentioned above.

Figure 16:
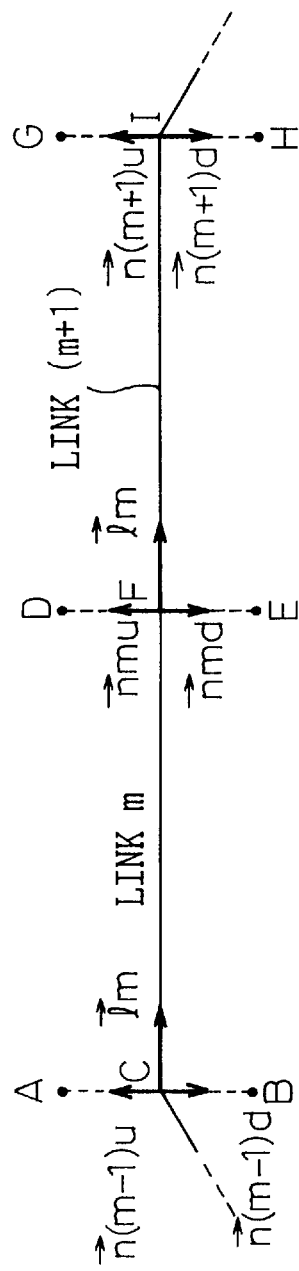
FIG. 16 explains link data on a parallel cable.

Steps ST513 and ST515 for a parallel cable will be explained with reference to FIG. 16.

If links m and m+1 are in parallel with each other, i.e., if they are on the same straight line, a directional vector $\vec{l}m$ of the link m is in parallel with a directional vector $\vec{l}(m+1)$ of the link m+1. It is impossible to find normal vectors $\vec{n}mu$ and $\vec{n}md$ at a way point F between the two links m and m+1. Namely, it is impossible to find the coordinates of points D and E related to the point F. In this case, links are traced until a link that is not in parallel with the links m and m+1 is reached. Then, normal vectors for the reached link are found and used for the parallel links. Namely, normal vectors $\vec{n}(m+1)u$ and $\vec{n}(m+1)d$ are found at a start point of the reached link. Since normal vectors $\vec{n}(m-1)u$ and $\vec{n}(m-1)d$ are known, vectors $\vec{n}mu$ and $\vec{n}md$ are determined according to them, and the coordinates of the points D and E are determined.

Figure 17:
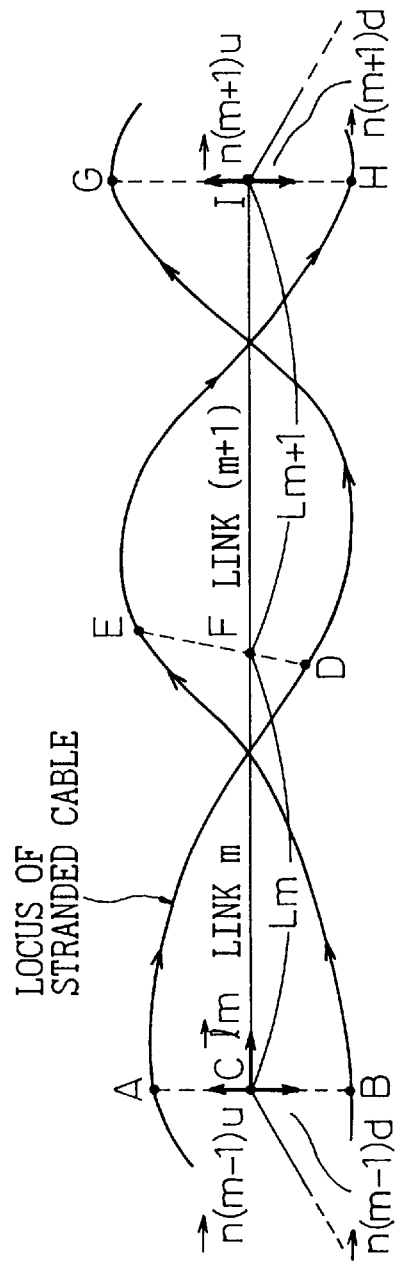
FIG. 17 explains link data on a stranded cable.

Steps ST513 and ST515 for a stranded cable will be explained with reference to FIG. 17.

If links m and m+1 are in parallel with each other, i.e., if they are on the same straight line, a directional vector $\vec{1}m$ of the link m and a directional vector $\vec{1}(m+1)$ of the link m+1 are in parallel with each other. It is impossible to determine normal vectors $\vec{n}mu$ and $\vec{n}md$ at a way point F between the links m and m+1. Namely, it is impossible to find the coordinates of points D and E related to the way point F. In this case, similar to the parallel cable, vectors $\vec{n}(m+1)u$ and $\vec{n}(m+1)d$ are found first, and then, the coordinates of the points D and E are determined. What is different from the parallel cable is that the points D and E are determined on loci of the stranded cable. This will be explained in more detail.

(1) The total length $Lm+L_{m+1}$ of the parallel links m and m+1 is calculated.

(2) The total length is divided by a twist pitch ψ of the stranded cable as $(Lm+L_{m+1})/\psi$, to provide the number of turns r and a remainder R as follows:

$$(Lm+L_{m+1})/\psi=r+R$$

(3) The twist pitch ψ is changed so that it approaches a real twist pitch. The number of turns is adjusted to "r" or "r±0.5." If $0 \leq R \leq 0.5$, it is r, and if $0.5 < R < 1$, it is r+0.5.

(4) The twist pitch ψ is changed to ψ' as follows:

$$\psi'=(Lm+L_{m+1})/r, \text{ if } (0 \leq R \leq 0.5)$$

$$\psi'=(Lm+L_{m+1})/(r+0.5), \text{ if } (0.5 < R < 1)$$

(5) The changed twist pitch ψ' is used to calculate Lm/ψ' to provide the number of turns r' and a remainder R' for the point F.

(6) The remainder R' satisfies $0 \leq R' < 1$. This corresponds to a twist angle of $0 \leq \phi < 360$ of the stranded cable with respect to $\vec{n}(m-1)u$.

(7) With these pieces of data, the coordinates of the points D and E are determined.

In this way, steps ST513 and ST515 determine link data. Step ST516 sets the reached link as the present link. Step ST517 checks to see if the present link is the last link connected to the cable outlet. If it is not the last link, the flow returns to step ST511. If it is the last link, step ST518 copies link data for the end point of the preceding link, the coordinates of conductor positions at the cable outlet, and the middle point found in step ST506, to prepare link data for the last link. Then, the flow returns to step ST501.

If step ST512 determines that there is no link to provide normal vectors, there is no change in the directional vector up to the last link. Then, step ST519 uses normal vectors specified by the coordinates of conductor positions at the cable outlet, to determine link data for the present link, last link, and intermediate links between the present and last links. Then, the flow returns to step ST501.

More precisely, normal vectors found from the coordinates of conductor positions at the cable outlet are applied to the end point of the present link, the start point of the last link, and the start and end points of each intermediate link. Then, the coordinates of each conductor position distanced from the start and end points of each link by half the conductor-to-conductor distance are found on the normal vectors. Link data for the end point of the last link is obtained by copying the coordinates of conductor positions at the cable outlet and the middle point found in step 506. Link data for the start point of the present link including the coordinates of the middle point thereof is obtained by copying as mentioned above.

In this way, the apparatus 1 of the present invention carries out the link data determining process to determine link data for each of the links that represent the cable and connect the cable inlet to the cable outlet.

The parallel or stranded cable is bent orthogonally to a normal of the cable at each way point. The reason of this is to secure the length of the cable, or the length of the links, and to secure the lengths of going and returning paths of signals.

When an actual two-wire cable is bent at a way point, one conductor and insulator loosen and the others tighten. To prepare a neat model of the cable for simulations, it is preferable to bend the cable orthogonally to a normal as mentioned above.

Figure 7:
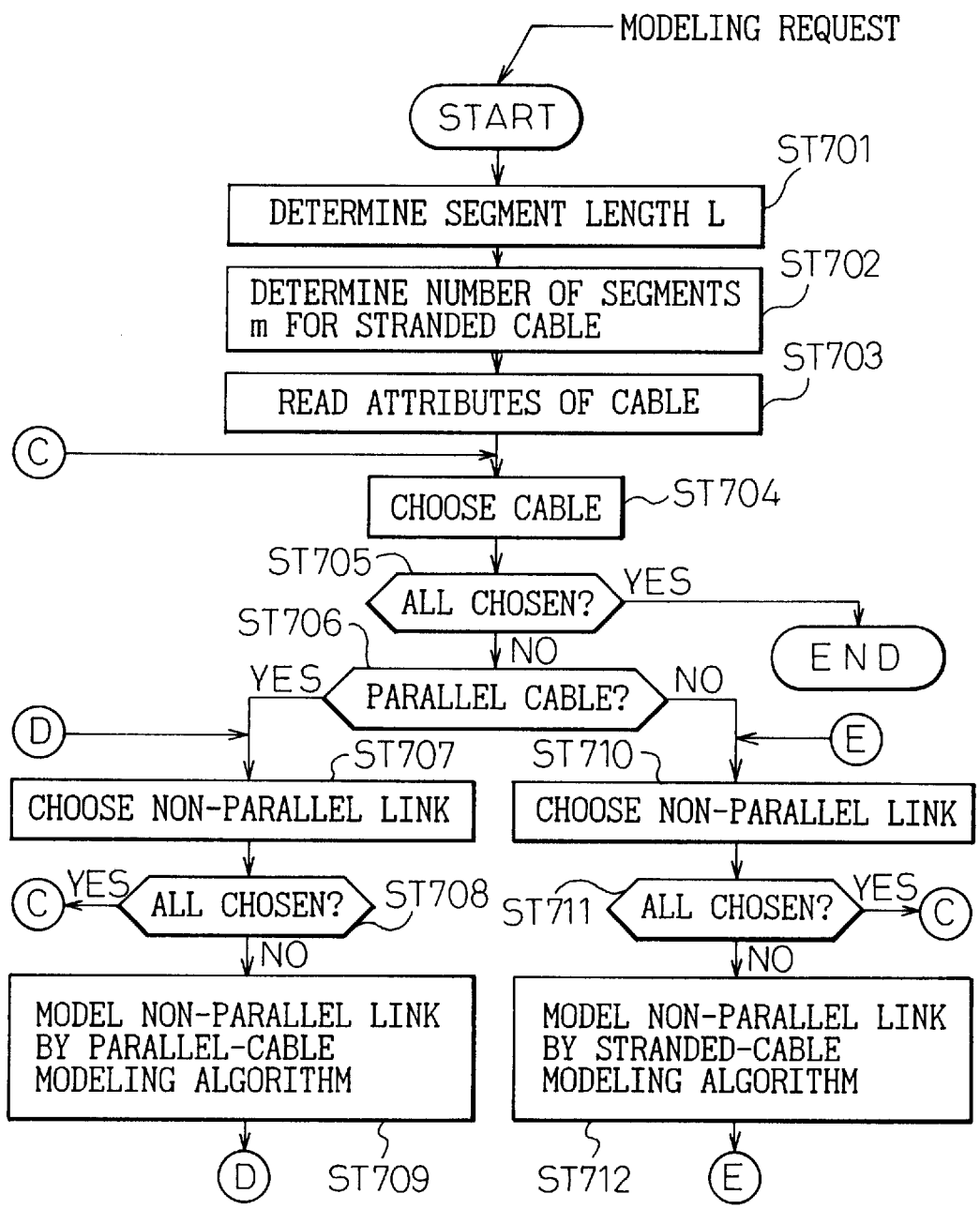
FIG. 7 is a flowchart illustrating in detail the cable modeling process of FIG. 2, in accordance with an exemplary embodiment the present invention.

FIG. 7 is a flowchart showing the details of the cable modeling process of step ST203 of FIG. 2.

Step ST701 determines a segment length L for the moment method as follows:

$$L=(1/10) \times (f/c)$$

where f is the maximum frequency of the analyzing frequencies of electromagnetic field to be analyzed and c is the velocity of light.

Step ST702 interactively determines the number of segments per twist pitch of a stranded cable as "m." The moment method divides an electric device into meshes with the segment length L. A twist pitch ψ of a stranded cable is usually shorter than the segment length L. If the stranded cable is divided into meshes according to the segment length L, twists of the cable will disappear. Accordingly, each pitch of the stranded cable is divided by "m," for example 24, into segments. For this purpose, step ST702 interactively sets the number of segments m, which is an even number.

Step ST703 reads cable attributes from the cable library 200.

Step ST704 chooses a target two-wire cable in the electric device. Step ST705 checks to see if all cables have been chosen. If all cables have been chosen, the cable modeling process ends.

If step ST704 successively chooses a target cable, step ST704 determines that some cables are left to be chosen. Then, step ST706 determines whether or not the target cable is a parallel cable or a stranded cable.

If the cable is a parallel cable, step ST707 chooses one of the non-parallel links of the cable. A non-parallel link is a link that is not parallel to its adjacent link and that shows no change in normal direction at any point within the link.

Step ST708 determines whether or not all non-parallel links have been chosen. If all non-parallel links have been chosen, the flow returns to step ST704 to model the next two-wire cable. If some non-parallel links are left to be chosen, step ST709 employs a parallel-cable modeling algorithm, to generate a model of the chosen non-parallel link for the moment method. Then, the flow returns to step ST707 to model the next non-parallel link of the cable chosen in step ST704.

If step ST706 determines that the target cable is a stranded cable, step ST710 chooses one of the non-parallel links of the cable.

Step ST711 checks to see if all non-parallel links have been chosen. If all non-parallel links have been chosen, the flow returns to step ST704 to model the next two-wire cable. If a non-parallel link has been chosen, step ST712 uses a stranded-cable modeling algorithm, to generate a model of the chosen non-parallel link for the moment method. Then, the flow returns to step ST710 to model the next non-parallel link of the target cable chosen in step ST704.

Figure 8:
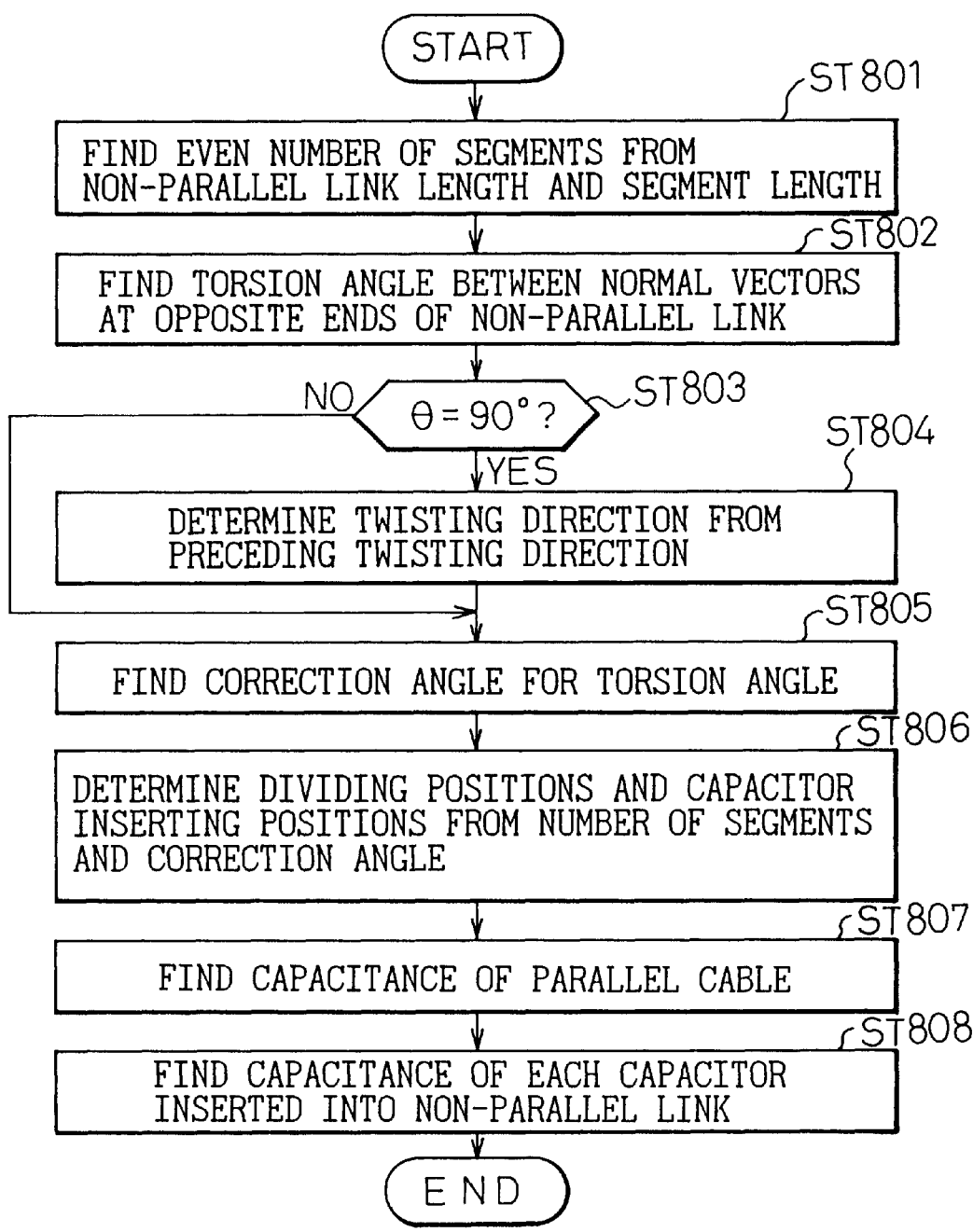
FIG. 8 is a flowchart illustrating a parallel-cable modeling algorithm, in accordance with an exemplary embodiment the present invention.
Figure 9:
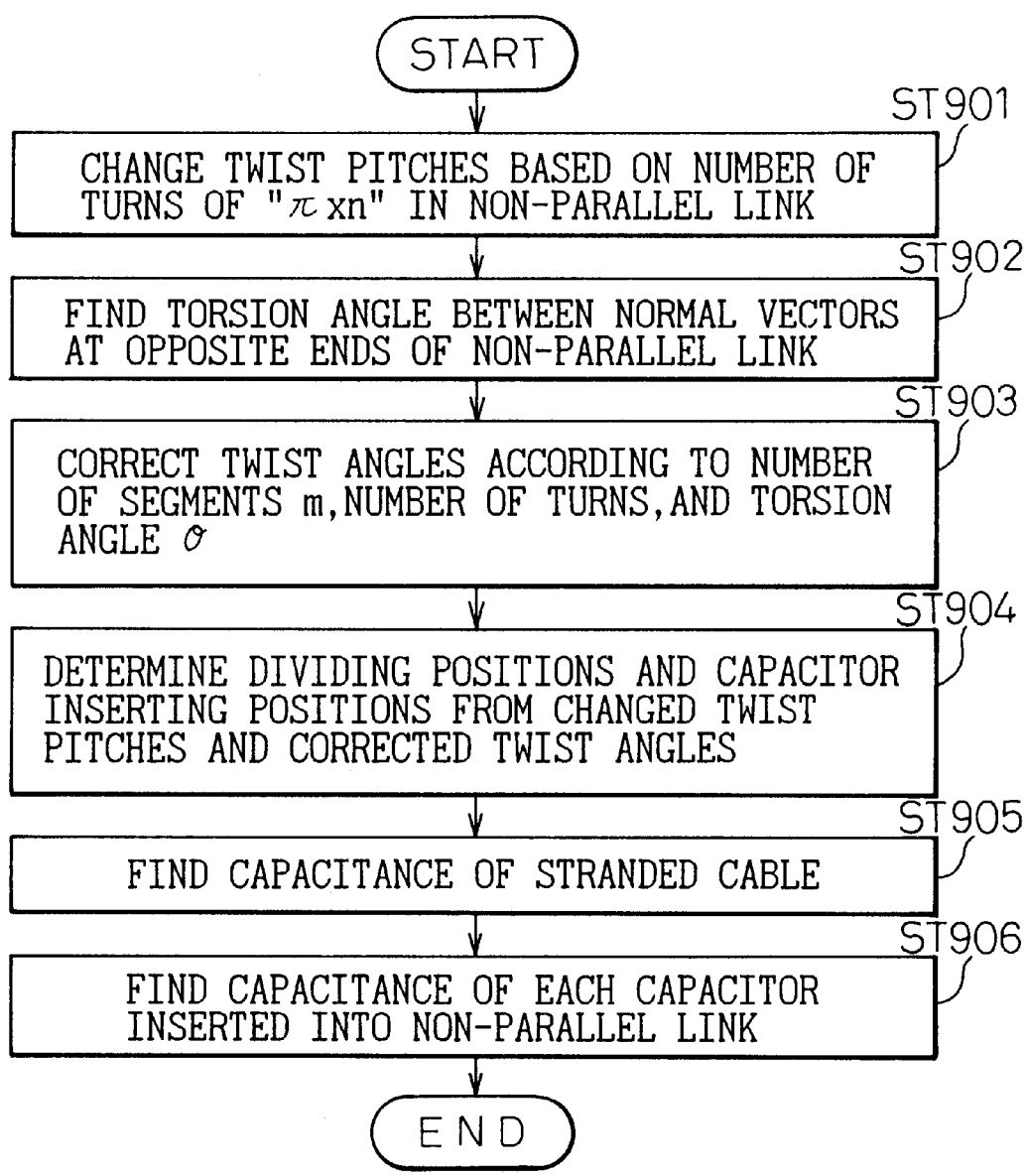
FIG. 9 is a flowchart illustrating a stranded-cable modeling algorithm, in accordance with an exemplary embodiment the present invention.

Flowcharts of FIGS. 8 and 9 will be explained. The flowchart of FIG. 8 shows the details of the parallel-cable modeling algorithm of step ST709 of FIG. 7. The flowchart of FIG. 9 shows the details of the stranded-cable modeling algorithm of step ST712 of FIG. 7.

The parallel-cable modeling algorithm of FIG. 8 will be explained.

Step ST801 divides the non-parallel link by the segment length L, to determine the number of segments as M, which must be even. If the quotient is odd, "1" is added to the quotient to provide an even number M, because the accuracy of the moment method improves as the size of each segment decreases.

Figure 18:
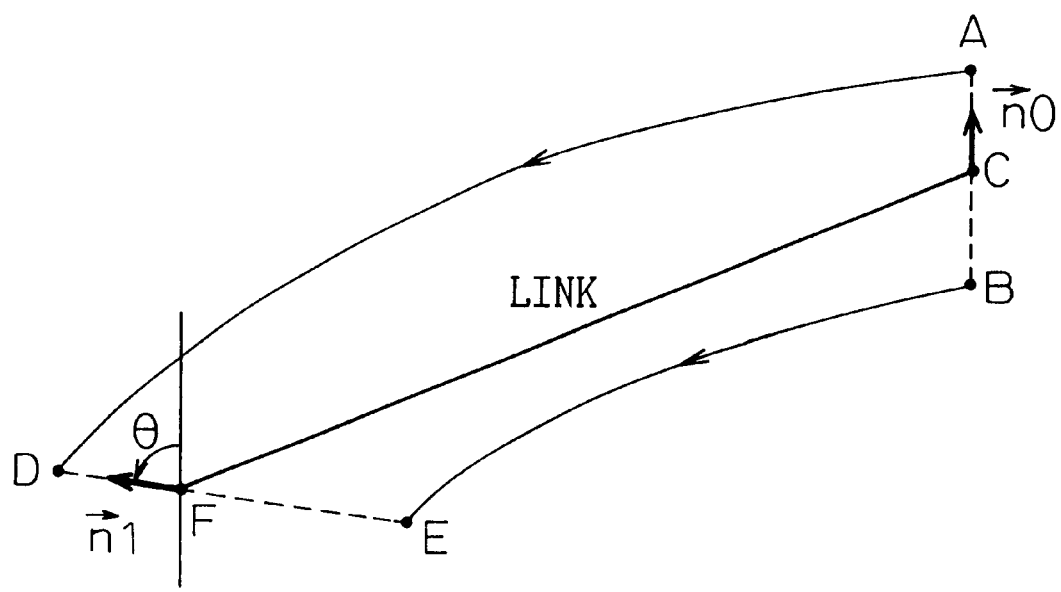
FIG. 18 explains a torsion angle between normal vectors.

Step ST802 finds a torsion angle $\theta$ between normal vectors at each end of the non-parallel link. As shown in FIG. 18, the torsion angle $\theta$ is formed between a normal vector at a start point (A, B) and a normal vector at an end point (D, E) of the non-parallel link.

Step ST803 checks to see if $\theta=90$ (degrees). If $\theta=90°$, step ST804 determines a twisting direction. If a preceding twist of $\theta=90°$ is a right twist, the present twist of $\theta=90°$ will be a left twist. If the preceding twist of $\theta=90°$ is a left twist, the present twist of $\theta=90°$ will be a right twist.

Figure 19:
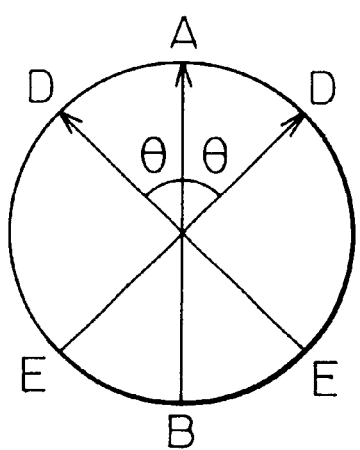
FIG. 19 explains a relationship between the start and end of a link.

If $\theta<90°$ as shown in FIG. 19, the point A is connected to the point D, and the point B to the point E so that the start point (A, B) may correspond to the end point (D, E). If $\theta=90°$, the parallel cable is twisted rightward or leftward. If only one twisting direction is employed through the parallel cable, the parallel cable will be rapidly twisted in that employed direction. To avoide this, if $\theta=90°$, the parallel cable is twisted in alternate directions.

Step ST805 divides the torsion angle $\theta$ by the M segments, to provide a correction angle $\phi$ for correcting the torsion angle $\theta$. The correction angle $\phi$ indicates an angle to twist each of the M segments.

Step ST806 determines dividing positions where capacitors are inserted.

Figure 20:
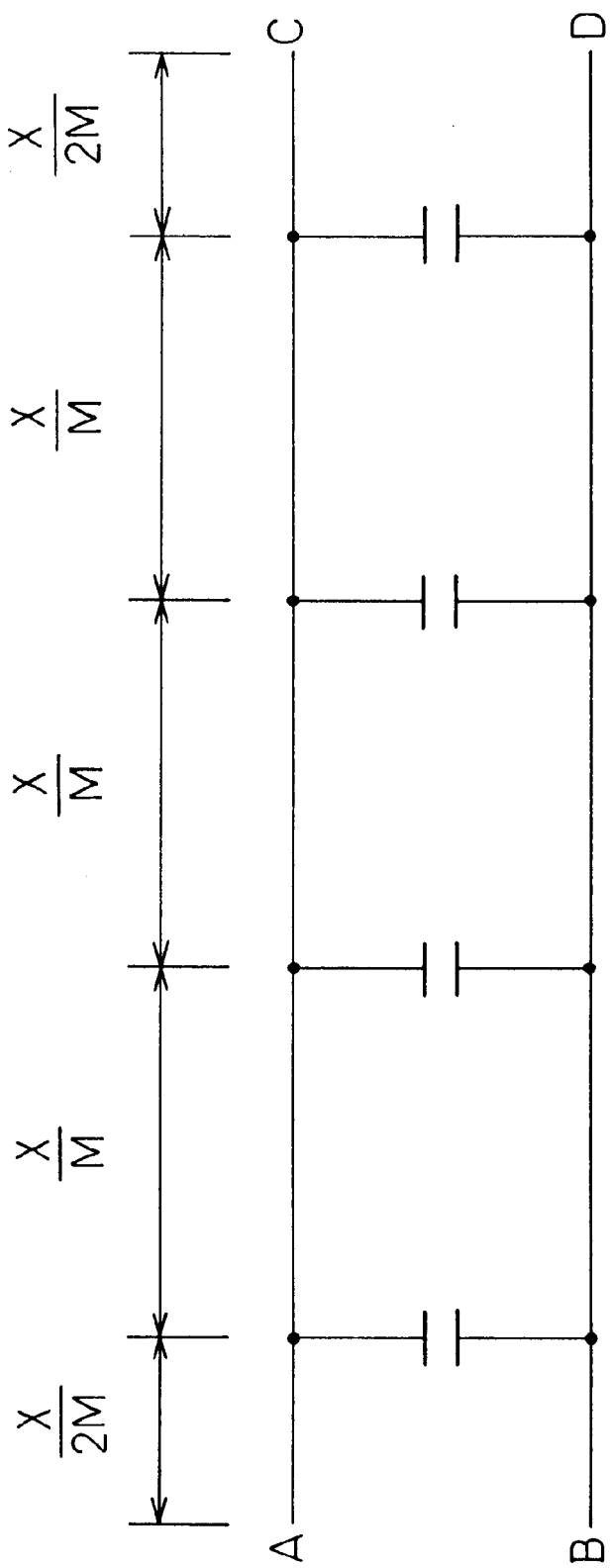
FIG. 20 shows capacitor inserting positions on a model of a parallel cable.

If the length of the non-parallel link is X, the dividing positions are set at intervals of X/M with a first one being set X/2M away from the start point of the non-parallel link. The conductors of the parallel cable are twisted by $\phi/2$ at the first dividing position and thereafter by $\phi$ at each dividing position. At each dividing position, the coordinates of a point half the conductor-to-conductor distance away from the non-parallel link are determined as the coordinates of a corresponding conductor of the parallel cable. FIG. 20 shows positions where capacitors are inserted. The capacitors are inserted at intervals of X/M with a first capacitor being positioned X/2M away from the start point of the non-parallel link. Black dots in FIG. 20 represent conductor dividing positions.

Step ST807 calculates the capacitance of a unit length of the parallel cable. If the capacitance is registered in the cable library 200, the registered one is used. If not, the capacitance is calculated according to formulae.

Electromagnetism provides the following formula for a two-wire cable:

$$L_0 = (\mu_0/\pi) \ln [(D+(D^2-4a)^{1/2})/2a] = (\mu_0/\pi) \ln (D/a)$$

where 2a is the diameter (expressed by meters) of each of two conductors that run in parallel, D is a conductor-to-conductor distance expressed by meters, and $L_0$ is the inductance of a unit length of the bare cable in air.

The capacitance $C_0$ of a unit length of the cable in air is as follows:

$$C_0 = (\pi\epsilon_0)/\ln [(D+(D^2-4a)^{1/2})/2a] = (\pi\epsilon_0)/\ln (D/a)$$

where a condition a<<D is satisfied.

The characteristic impedance $Z_0$ of the cable in air is as follows:

$$Z_0 = (L_0/C_0)^{1/2} = (1/\pi)(\mu_0/\epsilon_0)^{1/2} \ln (D/a)$$

where $\mu_0$ is the space permeability, and $\epsilon_0$ is the space dielectric constant.

In the above expressions of $L_0$ and $C_0$, usually the condition a<<D is satisfied for common parallel cables and stranded cables.

Characteristic impedance Z registered in the cable library 200 is an actual value that considers an insulator around a conductor. The effective dielectric constant $\epsilon$reff of an insulator has the following relationship with respect to the characteristic impedance $Z_0$ in air and the actual characteristic impedance Z:

$$Z/Z_0 = (\epsilon\text{reff})^{1/2}$$

Accordingly, the effective dielectric constant $\epsilon$reff is calculable from the calculated characteristic impedance $Z_0$ in air and the characteristic impedance Z retrieved from the cable library 200. Then, the capacitance C of a unit length of the cable having the insulator is as follows:

$$C = \epsilon\text{reff } C_0 - C_0 = C_0(\epsilon\text{reff}-1)$$

Step ST807 first calculates the capacitance $C_0$ and characteristic impedance $Z_0$ of a unit length of the parallel bare cable in air according to the formulae. Step ST807 uses the calculated characteristic impedance $Z_0$ and the characteristic impedance Z read out of the cable library 200 and calculates the effective dielectric constant $\epsilon$reff of an insulator of the parallel cable. Then, step ST807 uses the effective dielectric constant $\epsilon$reff and capacitance $C_0$ and calculates the capacitance of a unit length of the parallel cable.

If the cable has non-circular conductors, the formulae mentioned above will be inapplicable. In this case, two-dimensional analyses are used to find the inductance $L_0$ and capacitance $C_0$ of a unit length of the bare cable in air. Then, the capacitance C of a unit length of the cable having the conductors covered with an insulator is calculable as mentioned above.

In this way, step ST807 provides the capacitance of a unit length of the parallel cable. Step ST808 determines the capacitance of each capacitor inserted into the non-parallel link. This is done by multiplying the capacitance of a unit length of the parallel cable by the length of the non-parallel link, and by dividing the product by the number of capacitors to be inserted. In the example of FIG. 20, the number of capacitors to be inserted is 4.

Eventually, a model for the moment method is made as shown in FIG. 20. This model is a ladder circuit consisting of metal lines and capacitors. The thickness of each metal line corresponds to the diameter of each conductor of the parallel cable.

Next, the flowchart of FIG. 9 will be explained. This flow chart shows the details of the stranded-cable modeling algorithm of step ST712 of FIG. 7.

To model a non-parallel link of the stranded cable, step ST901 examines the length of the non-parallel link and the twist pitches of the stranded cable and changes the twist pitches so that the conductors of the cable for the non-parallel link may involve "π×n" turns. If the stranded cable has twist pitches of 10 mm for which the cable turns once, and if the length of the non-parallel link is 47 mm, the cable in the link turns 4.7 times if no change is made in the twist pitches. In this case, each end of the non-parallel link does not agree with a loop of the cable. Accordingly, the twist pitches of the cable are changed around π×n so that the cable turns 4.5 times within the non-parallel link and so that each end of the non-parallel link agrees with a loop of the cable.

More precisely, the length X of the non-parallel link is divided by the twist pitch ψ, to provide a quotient "r" and a remainder "R." If $0 \leq R \leq 0.5$, the pitch ψ is changed to "X/r" so that the stranded cable turns r times. If $0.5 < R < 1$, the twist pitch ψ is changed to "X/(r+0.5)."

If the twist pitches ψ are changed according to a fixed algorithm, the twist pitches ψ may be biased to a smaller or larger side on the total length of the cable. To avoid this, the twist pitches ψ may alternately be changed. If the twist pitches ψ are reduced in a given non-parallel link, they are increased in the next non-parallel link, to balance changes in the twist pitches ψ for the total length of the cable.

Figure 21:
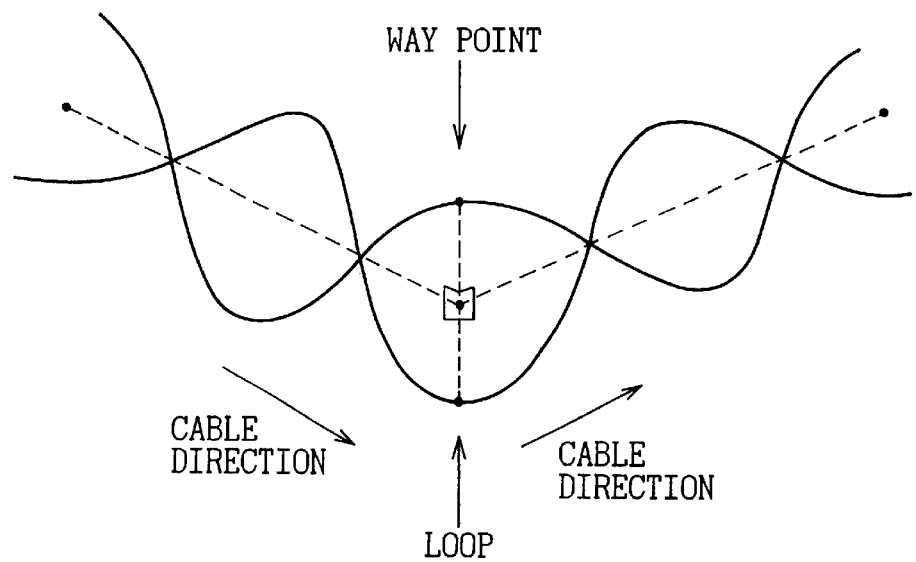
FIG. 21 explains a process of changing the twist pitches of a stranded cable.

As shown in FIG. 21, the twist pitches are adjusted so that each end of a non-parallel link agrees with a loop of the stranded cable. This results in equalizing the lengths of signal sending and returning conductors of the cable to each other.

Step ST901 changes the twist pitches, and step ST902 finds a torsion angle θ between normal vectors at opposite ends of the non-parallel link. As shown in FIG. 18, the torsion angle θ is found between a normal vector at a start point (A, B) and a normal at an end point (D, E) of the non-parallel link.

Step ST903 corrects a twist angle set for each of the m segments set in step ST702 according to the number of segments m, the number of turns for the non-parallel link changed in step ST901, and the torsion angle θ found in step ST902.

This correction is made for absorbing the torsion angle θ. If the number of segments m is 12, a twist angle for each sampling point on each segment is 30 degrees (360/12=30). At each sampling point, conductor positions of the cable are determined. Twisting the stranded cable by 30 degrees at each sampling point cannot absorb the torsion angle θ.

If the number of turns determined in step ST901 is 4.5, the total number of sampling points through the non-parallel link is 54 (4.5×12=54). If the torsion angle θ is 40 degrees, the 54 sampling points must absorb the torsion angle of 40 degrees. For this purpose "40/54=0.74" degrees are added to or subtracted from the twist angle of 30 degrees. In this way, the twist angle determined by the segment number m is corrected. Generally, a torsion angle θ and a correction angle on a twist angle α are expressed as follows:

(θ/360)×(α/2)=θα/720

Adding or subtracting the correction angle to or from the twist angle is determined according to the twisting direction of the stranded cable and the direction of the torsion angle θ. If the stranded cable is turned clockwise in an advancing direction and if the torsion angle θ is clockwise, the addition is made, and if the torsion angle θ is counterclockwise, the subtraction is made. If the stranded cable is turned counterclockwise in an advancing direction and if the torsion angle θ is clockwise, the subtraction is made, and if the torsion angle θ is counterclockwise, the addition is made.

In this way, step ST903 corrects the twist angle determined by the number of segments m. Step ST904 determines dividing positions on the conductors of the stranded cable where capacitors are inserted according to the twist pitches changed in step ST901 and the twist angle corrected in step ST903.

Figure 22:
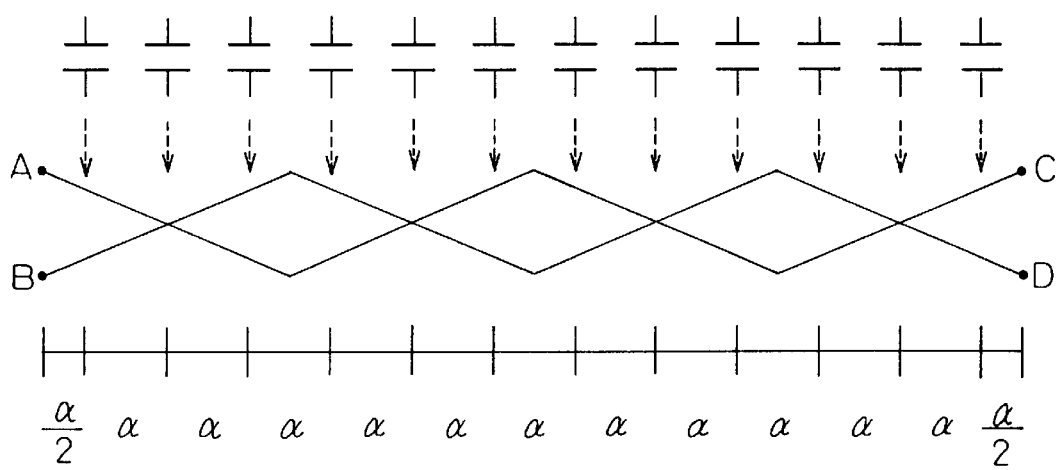
FIG. 22 shows capacitor inserting positions on a model of a stranded cable.

More precisely, step ST904 twists the stranded cable at intervals of a with only a first twist angle being α/2. At each twist, step ST904 determines the coordinates of conductors according to the twist angle and twist pitches. Positions where capacitors are inserted are determined as shown in FIG. 22. Namely, capacitors are inserted at intervals of α in twist angle with only a first capacitor being inserted at a position corresponding to a twist angle of α/2.

Step ST905 finds the capacitance of a unit length of the stranded cable according to the same technique as that for the parallel cable. First, the capacitance $C_0$ and characteristic impedance $Z_0$ of a unit length of the stranded cable in air are calculated according to the formulae. The characteristic impedance $Z_0$ and the characteristic impedance Z retrieved from the cable library 200 are used to calculate the effective dielectric constant εreff of an insulator used for the stranded cable. The effective dielectric constant εreff and the capacitance $C_0$ are used to calculate the capacitance of a unit length of the stranded cable.

Figure 23:
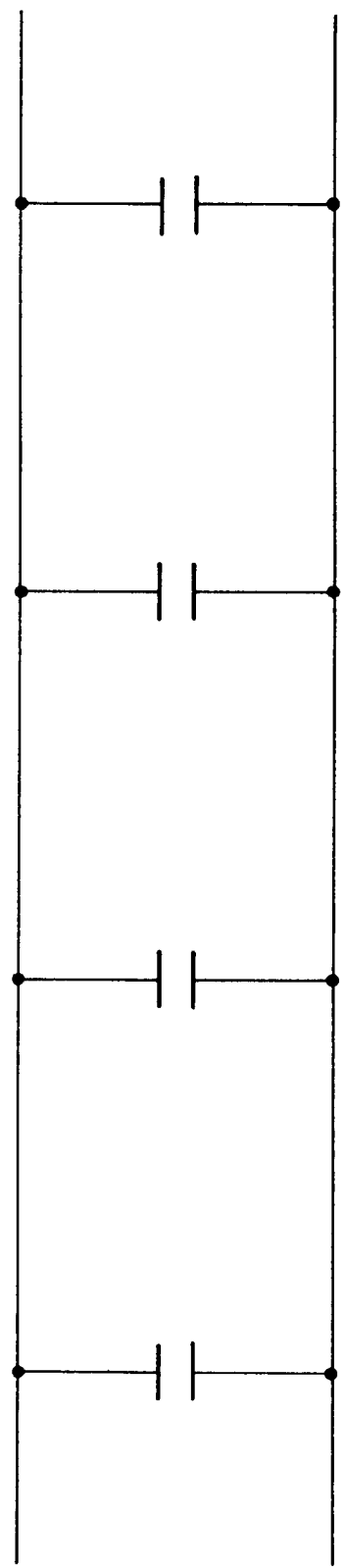
FIG. 23 explains a model of a parallel cable for the moment method.

Step ST906 determines the capacitance of each capacitor inserted into the non-parallel link. Namely, step ST906 multiplies the capacitance of a unit length of the stranded cable calculated in step ST905 by the length of the non-parallel link and divides the product by the number of capacitors to be inserted. In the example of FIG. 23, the number of capacitors is 12.

In this way, the stranded-cable modeling algorithm of FIG. 9 generates a model of the stranded cable as shown in FIG. 22 for the moment method. The model is a ladder circuit consisting of metal lines and capacitors. The diameter of the metal line corresponds to the diameter of a conductor of the stranded cable.

As explained above, the steps of FIGS. 8 and 9 generate a model of a parallel or stranded cable for the moment method, as shown in FIG. 23.

When applying the moment method to the model of FIG. 23, segmental currents shown in FIG. 24A are assumed. Also assumed are distributions of the segmental currents shown in FIG. 24B. These currents are used to find mutual impedance. At this time, the capacitance of each capacitor is added to self-impedance components.

Verification tests carried out for verifying the effect of parallel- and stranded-cable models prepared according to the present invention will be explained.

Figure 25A:
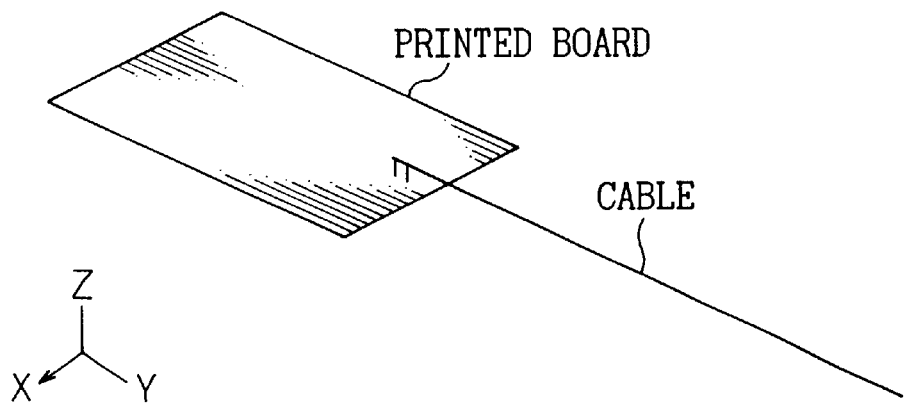

FIG. 25A shows an arrangement used for the verification tests. A parallel or stranded cable was connected to a printed board, and high-frequency signals were supplied from the printed board to the cable. The strength of an electromagnetic field radiated from the cable was calculated with the use of a model of the cable prepared according to the present invention. A result of the calculation was compared with an actually measured value.

Figure 25B:
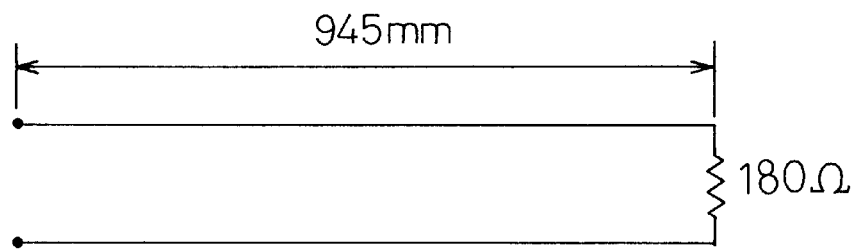
Figure 25C:
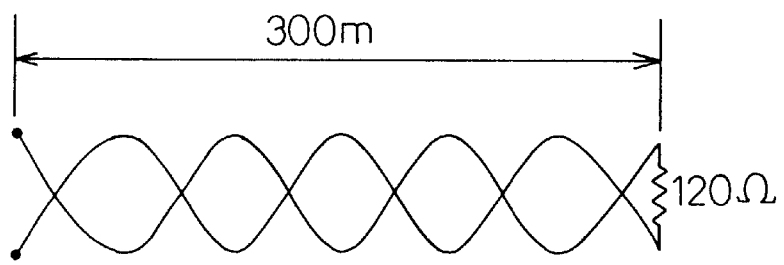

FIG. 25B shows a parallel cable used for the tests. The cable had a length of 945 mm, and a resistor of 180Ω was connected to an end of the cable. FIG. 25C shows a stranded cable used for the tests. The cable had a length of 300 mm, and a resistor of 120Ω was connected to an end of the cable. Other data related to the cables used for the tests are shown in FIG. 26.

Figure 27A:
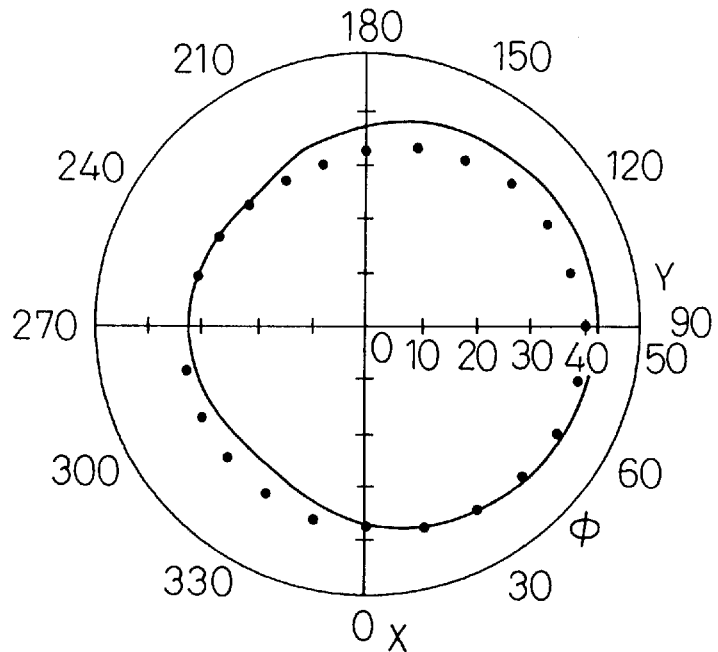
FIGS. 27A, 27B, 28A, and 28B show results of the verification tests.
Figure 27B:
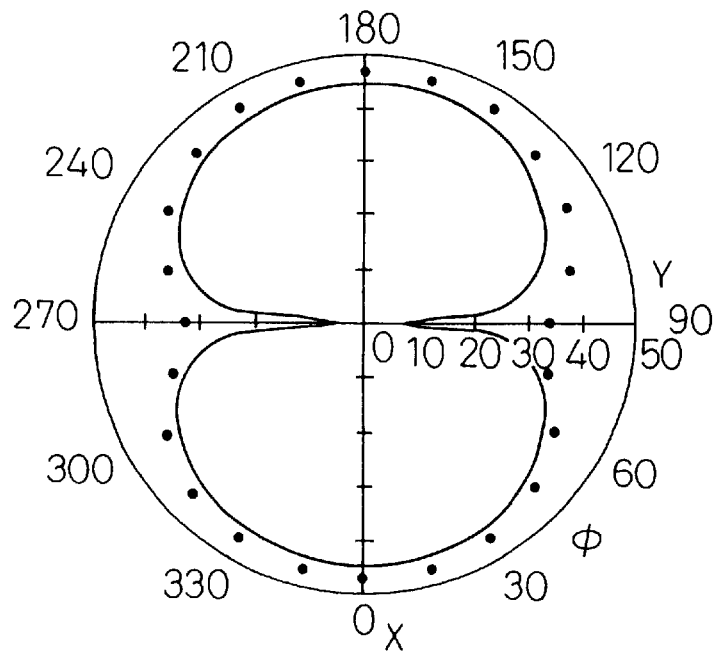
Figure 28A:
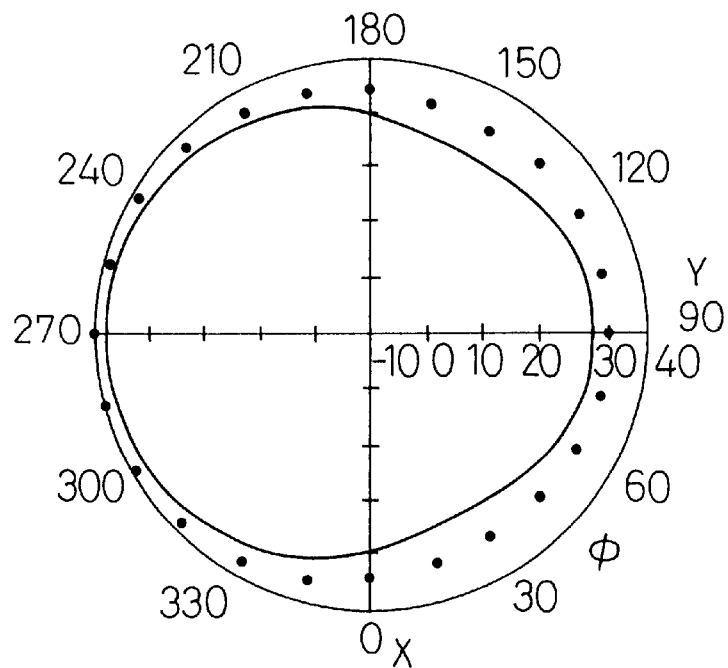
Figure 28B:
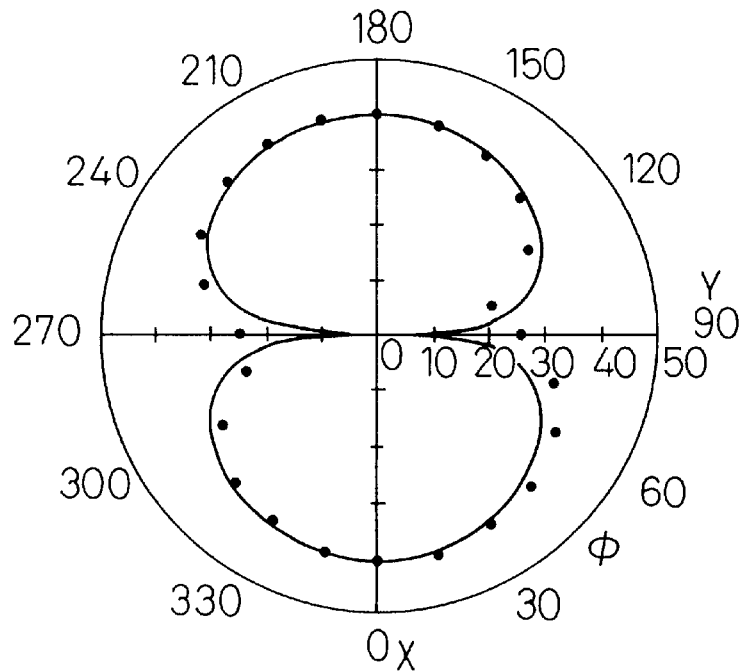

FIGS. 27A and 27B show test results of the parallel cable, and FIGS. 28A and 28B show test results of the stranded cable.

The parallel cable was tested according to a 10-m method that set an observation point at 10 m ahead and 2 m high. A signal frequency of 50 MHz was used for the test. FIG. 27A shows the test results in a vertical direction, and FIG. 27B shows the test results in a horizontal direction. A continuous line indicates calculated values, and dots indicate measured values.

The stranded cable was tested according to a 3-m method that set an observation point 3 m ahead and 2 m high. A signal frequency of 50 MHz was used for the test. FIG. 28A shows the test result in a vertical direction, and FIG. 28B shows the test result in a horizontal direction. A continuous line indicates calculated values, and dots represent measured values.

These test results show that the values calculated by the present invention well agree with the measured values, to verify the effect of the present invention.

The embodiment mentioned above models a stranded cable by changing the twist pitches thereof so that each way point specified by the user may agree with a loop of the stranded cable. Instead of changing the twist pitches, it is possible to change the way points themselves so that each way point agrees with a loop of the stranded cable. In this case, instead of automatically adjusting the way points, a necessity of adjusting the way points is informed to the user beforehand and, only when the user accepts it, is the adjustment carried out.

As explained above, the present invention provides an apparatus for calculating the strength of an electromagnetic field radiated from an electric device according to the moment method. The apparatus of the present invention allows two-wire cables to be freely arranged in the electric device so that the user may know the strength of an electromagnetic field radiated from not only an actual arrangement of the cables but also other arrangements thereof to see the effect of each arrangement.

The apparatus of the present invention models each parallel and stranded cable arranged in an electric device into a ladder circuit consisting of metal lines and capacitors, to precisely calculate the strength of an electromagnetic field radiated from the electric device.

What is claimed is:

1. An apparatus for calculating the strength of an electromagnetic field radiated from an electric device according to a moment method, wherein the moment method is based on integral equations derived from electromagnetic equations, comprising:

setting means for interactively setting a name of a two-wire cable arranged in the electric device and coordinates of the two-wire cable at a cable inlet, a cable outlet, and way points in the electric device, the way points being prepared as and when required to bend the two-wire cable between the cable inlet and the cable outlet;

library means corresponding to at least one cable name, respectively, and storing attributes of a corresponding cable comprising of the name, type, characteristic impedance, and structural data of the two-wire cable;

generation means for generating a moment-method model of the two-wire cable according to the attributes of the two-wire cable read out of the library means specified by the name of the two-wire cable set by the setting means and the coordinates of the two-wire cable at the cable inlet, cable outlet, and way points set by the setting means; and calculation means for calculating the strength of the electromagnetic field radiated from the electric device according to the moment-method model of the two-wire cable and the moment method.

2. The apparatus of claim 1, wherein the generation means generates the moment-method model with lines and capacitors, the lines being divided into sections that are each divided into segments to approximate core conductors of the two-wire cable, and the capacitors being arranged between the segments.

3. The apparatus of claim 2, wherein the generation means employs formulae to find the inductance and capacitance of a unit length of the core conductors of the two-wire cable on the condition that the core conductors are bare in air, calculate the characteristic impedance of the two-wire cable in air according to the found inductance and capacitance, and find the capacitance of the unit length of the core conductors of the two-wire cable according to the calculated characteristic impedance and the characteristic impedance contained in the attributes of the two-wire cable, and determines the capacitance of each of the capacitors to form the moment-method model according to the found capacitance of the unit length of the core conductors of the two-wire cable and the number of the lines.

4. The apparatus of claim 1, wherein, if the two-wire cable is a stranded cable, the generation means changes twist pitches of the stranded cable so that each way point used to change the direction of the stranded cable meets a loop of the stranded cable, plots conductor positions in each section of the stranded cable through which the direction of the stranded cable is unchanged according to the changed twist pitches and specified twist angles, and traces the conductor positions plotted with lines to generate the moment-method model of each section of the stranded cable.

5. The apparatus of claim 4, wherein, if any section of the stranded cable involves torsion between a start and end of each section, the generation means corrects the specified twist angles to absorb the torsion and generates the moment-method model of each section according to the corrected twist angles.

6. The apparatus of claim 5, wherein
the generation means generates the moment-method model with lines that approximate core conductors of the stranded cable and capacitors arranged between the lines; and
the capacitors are arranged according to the corrected twist angles.

7. The apparatus of claim 4, wherein the generation means changes the twist pitches of the stranded cable to balance changes to shorten the twist pitches with changes to elongate the twist pitches.

8. The apparatus of claim 1, wherein, if the two wire cable is a stranded cable,
the setting means adjusts the position of each way point around the same so that the way point meets a loop of the stranded cable, and
the generation means plots core conductor positions in each section of the stranded cable through which the direction of the stranded cable is unchanged according to twist pitches of the stranded cable and specified twist angles, and traces the plotted core conductor positions with lines to generate the moment-method model of each section of the stranded cable.

9. The apparatus of claim 1, wherein, if the two-wire cable is a parallel cable, the generation means divides each section of the parallel cable, through which the direction of the parallel cable is unchanged, into segments having a specified or shorter length, plots core conductor positions of the parallel cable in the segments, and traces the core conductor positions plotted with lines to generate the moment-method model of each section of the parallel cable for the moment method.

10. The apparatus of claim 9, wherein, if any section of the parallel cable involves torsion between a start and end of each section, the generation means plots core conductor positions of the parallel cable in the segments of each section in consideration of the torsion and traces the plotted core conductor positions with lines to generate a model of the section of the parallel cable.

11. The apparatus of claim 9, wherein, if any section of the parallel cable involves torsion between a start and end of each section, the generation means determines a positional relationship between the start and end of each section so that torsion will not accumulate when generating moment-method model of each section of the parallel cable.

12. A method of calculating the strength of an electromagnetic field radiated from an electric device according to a moment method, wherein the moment method is based on integral equations derived from electromagnetic equations, comprising interactively setting a name of a two wire cable arranged in the electric device and coordinates of the two-wire cable at a cable inlet, a cable outlet, and way points in the electric device, the way points being prepared as and when required to bend the cable between the two-wire cable inlet and the cable outlet;

storing, in library means corresponding to cable names, respectively, the attributes of a corresponding cable comprising of the name, type, characteristic impedance, and structural data of the two-wire cable;

generating a moment-method model of the two-wire cable according to the attributes of the two-wire cable read out of the library means corresponding to the set name of the two-wire cable and the set coordinates of the two-wire cable at the cable inlet, cable outlet, and way points; and calculating the strength of the electromagnetic field radiated from the electric device according to the moment-method model of the two-wire cable and the moment method.

13. A computer readable storage controlling a computer to calculate the strength of an electromagnetic field radiated from an electric device according to a moment method, wherein the moment method is based on integral equations derived from electromagnetic equations, and comprising a process of:

interactively setting a name of a two wire cable arranged in the electric device and coordinates of the two-wire cable at a cable inlet, a cable outlet, and way points in the electric device, the way points being prepared as and when required to bend the cable between the two-wire cable inlet and the cable outlet;

storing, in library means corresponding to cable names, respectively, the attributes of a corresponding cable comprising of the name, type, characteristic impedance, and structural data of the two-wire cable;

generating a moment-method model of the two-wire cable according to the attributes of the two-wire cable read out of the library means corresponding to the set name of the two-wire cable and the set coordinates of the two-wire cable at the cable inlet, cable outlet, and way points; and calculating the strength of the electromagnetic field radiated from the electric device according to the moment-method model of the two-wire cable and the moment method.

\* \* \* \* \*